United States Patent
Crilly, Jr. et al.

(10) Patent No.: US 6,611,231 B2
(45) Date of Patent: Aug. 26, 2003

(54) WIRELESS PACKET SWITCHED COMMUNICATION SYSTEMS AND NETWORKS USING ADAPTIVELY STEERED ANTENNA ARRAYS

(75) Inventors: William J. Crilly, Jr., Liberty Lake, WA (US); Ken Biba, San Fransciso, CA (US); Robert J. Conley, Liberty Lake, WA (US)

(73) Assignee: Vivato, Inc., San Francisco, CA (US)

( * ) Notice: Subject to any disclaimer, the term of this patent is extended or adjusted under 35 U.S.C. 154(b) by 0 days.

(21) Appl. No.: 09/976,246

(22) Filed: Oct. 12, 2001

(65) Prior Publication Data

US 2002/0158801 A1 Oct. 31, 2002

Related U.S. Application Data

(60) Provisional application No. 60/287,163, filed on Apr. 27, 2001.

(51) Int. Cl.$^7$ .............................. G01S 3/16; G01S 3/28
(52) U.S. Cl. ................ 342/378; 370/310.1; 370/310.2; 370/902; 370/903; 370/905; 370/913
(58) Field of Search .................................. 842/379, 378; 370/310.1, 310.2, 902, 903, 905, 913, FOR 110

(56) References Cited

U.S. PATENT DOCUMENTS

2002/0105961 A1 * 8/2002 Hottinen et al. ............ 370/442

FOREIGN PATENT DOCUMENTS

WO    WO 00/72464 A1 * 11/2000    ............ H04B/7/06

OTHER PUBLICATIONS

An Overview of Smart Antenna Technology for Mobile Communications Systems, P.H. Lehne et al., IEEE Communications Surveys, http://www.comsoc.org/pubs/surveys, vol. 2(4), p. 2–13, Fourth Quarter 1999.*

Smart Antennas for Dummies, A. Jacobsen, Telenor Business Solutions AS, http:/www.telenor.no/fou/publisering/Rapp01/smart_antennas.pdf, Jul. 2000.*

A new adaptive MAC layer protocol for broadband packet wireless networks in harsh fading and interference environments, A.S.Acampora et al., IEEE/ACM Transactions on Networking, vol. 8(3), p. 328–336, Jun. 2000.*

High throughput slotted ALOHA packet radio networks with adaptive arrays, J. Ward et al., IEEE Transactions on Communications, vol. 41(3), p. 460–470, Mar. 1993.*

Carrier–sense protocols for packet–switched smart antenna basestations, C. Sakr et al., 1997 International Conference on Network Protocols, p. 45–52, 1997.*

(List continued on next page.)

Primary Examiner—Thomas H. Tarcza
Assistant Examiner—F H Mull
(74) Attorney, Agent, or Firm—Lee & Hayes, PLLC

(57) ABSTRACT

Methods, apparatuses and systems are provided for use in a wireless routing network. One apparatus, for example, includes an adaptive antenna that is configurable to receive a transmission signal from a transmitter and in response transmit corresponding outgoing multi-beam electromagnetic signals exhibiting a plurality of selectively placed transmission peaks and transmission nulls within a far field region of a coverage area. The adaptive antenna may also be configured to selectively receive at least one incoming electromagnetic signal directed through the coverage area. The adaptive antenna includes at least one antenna array and logic. The antenna array has a plurality of antenna elements. The logic is operatively coupled to the antenna array and configured to selectively control the placement of the transmission peaks and transmission nulls within the outgoing multi-beam electromagnetic signals. The logic may also be configured to selectively control the reception of at least one incoming electromagnetic signal. The logic is configured to be responsive to routing information. Such routing information may be dynamically maintained in one or more routing tables.

66 Claims, 18 Drawing Sheets

OTHER PUBLICATIONS

Improving the performance of a slotted ALOHA packet radio network with an adaptive array, J. Ward et al., IEEE Transactions on Communications, vol. 40(2), p. 292–300, Feb. 1992.*

An adaptive MAC prototcol for wireless ad hoc community network (WACNet) using electronically steerable passive array radiator antenna, S. Bandyopadhyay et al., 2001 IEEE Global Telecommunications Conference (GLOBECOM '01), vol. (5), p. 2896–2900, Nov. 2001.*

WACNet: wireless ad–hoc community network, K. Gyoda et al., 26th Annual Conference of the IEEE Industrial Electronics Society (IECON 2000), vol. 2, p. 1153–1158, 2000.*

Emerging adaptive antenna techniques for wireless ad–hoc networks, T. Ohira, 2001 IEEE International Symposium on Circuits and Systems (ISCAS 2001), vol. 4, p. 858–861, 2001.*

ATR: Angle–SINR Table Routing for Wireless Ad–hoc Networks, Y. Ohno et al, IEICE General Conference, Mar. 2000.*

* cited by examiner

WIRELESS PACKET SWITCHED COMMUNICATION SYSTEMS AND NETWORKS USING ADAPTIVELY STEERED ANTENNA ARRAYS

RELATED APPLICATIONS

This application is related to and hereby claims priority to provisional Patent Application Ser. No. 60/287,163, filed Apr. 27, 2001, and titled "Improved Multipath Communication Methods And Arrangements", and which is included herein by reference.

TECHNICAL FIELD

This invention relates to data communications, and more particularly to wireless communication systems, apparatuses and related methods that use adaptively steered antenna arrays.

BACKGROUND

Computers and other like devices can be interconnected in a variety of ways to allow data to be communicated between them. One of the most common ways to provide such data communication is through a wired network. Wired networks, such as, e.g., wide area networks (WANs) and local area networks (LANs) tend to have a high bandwidth and therefore can be configured to carry digital data at high data rates. One obvious drawback to wired networks is that a user's movement is constrained since the computer needs to be physically connected to the network. Thus, for example, a user of a portable computer will need to remain near to a wired network junction to stay connected to the wired network.

An alternative to wired networks is a wireless network that is configured to support similar data communications but in a more accommodating manner. Here, the user of a portable device will be free to move around a region that is supported by the wireless network. A well known example of a wireless network is a cellular telephone network. Indeed, in the past, cellular telephone modems have proven popular for use with portable laptop computers and other like devices, despite their relatively low bandwidth.

In the future it is expected that higher bandwidth wireless networks will become more popular, especially in creating metropolitan area networks (MANs) in which users, i.e., subscribers, have the ability to freely move their portable communicating devices around within a coverage area. Many conventional wireless communication systems and networks tend to use omni-directional antennas to transmit and receive data packets, for example, from a router to a subscriber's device. Being omni-directional, however, such transmissions may interfere with or otherwise restrict the use of other communicating devices that operate in the same frequency band.

Consequently, there is a need for improved packet switched wireless data communication systems, networks and related methods that effectively overcome such potential bottlenecks and other related problems.

SUMMARY

In accordance with certain aspects of the present invention, improved packet switched wireless data communication systems, networks, apparatuses, and related methods are provided.

By way of example, the above stated needs and other are met by an apparatus that can be used in a wireless routing network, in accordance with certain implementations of the present invention.

The apparatus includes an adaptive antenna that is configurable to receive a transmission signal from a transmitter and in response transmit corresponding outgoing multi-beam electromagnetic signals exhibiting a plurality of selectively placed transmission peaks and transmission nulls within a far field region of a coverage area. In certain further implementations, the adaptive antenna is also configured to selectively receive at least one incoming electromagnetic signal directed through the coverage area.

The adaptive antenna in certain implementations includes at least one antenna array and logic. The antenna array has a plurality of antenna elements. The logic is operatively coupled to the antenna array and configured to selectively control the placement of the transmission peaks and transmission nulls within the outgoing multi-beam electromagnetic signals. When applicable, the logic is also configured to selectively control the reception of the at least one incoming electromagnetic signal.

The above logic can be configured to be responsive to routing information in selectively controlling the placement of the transmission peaks and transmission nulls within the outgoing multi-beam electromagnetic signals, and selectively controlling the reception of the at least one incoming electromagnetic signal. In certain implementations, at least a portion of the routing information is dynamically determined and maintained by the logic. By way of example, the routing information may include transmit power level information, transmit data rate information, antenna pointing direction information, weighting information, constraints information, transmission null location information, transmission peak location information, Quality of Service (QoS) information, priority information, data packet lifetime information, frequency information, timing information, and/or keep out area information.

All or part of this routing information may be stored in one or more routing tables. The routing table(s) may further include routing information such as, e.g., IP address information, MAC address information, protocol identifying information, modulation method identifying information, Connection ID (CID) information, node directional information, node transmit power level information, node received signal strength indicator (RSSI) level information, transmit channel information, backup transmit channel information, receive channel information, backup receive channel information, transmission data rate information, receive data rate information, and interference nulling information.

The logic may also maintain weighting values within the routing information. The weighting values are associated with a selected weighting pattern that is to be applied to selectively control the placement of the transmission peaks and transmission nulls within the outgoing multi-beam electromagnetic signals, and further configured to selectively control the reception of the at least one incoming electromagnetic signal. Here, for example, weighting values $w(z)$ may be associated with a polynomial expansion $w(z)=w_0+w_1z+w_2z^2+w_3z^3+w_4z^4+\ldots+w_iz^i$. In certain implementations, the weighting values essentially define one or more zeros of the polynomial expansion. These zeros are associated with a direction that a transmission null is selectively placed.

In still further implementations, the logic further includes a search receiver that is configured to determine at least one transmission constraint based at least in part on the received signal. The transmission constraint can be included in the routing information.

The logic may also include a scheduler that is configured to establish at least one traffic schedule based at least in part on the routing information. Here, the routing information can further include transmission demand information. The scheduler can establish one or more traffic schedules by determining at least one assignment for an outgoing data transmission. In certain implementations, the scheduler includes COordinate Rotation DIgital Computer (CORDIC)-based transforming resources that are configurable to be applied to a combined angular, frequency and time arrangement of outgoing electromagnetic signals in establishing the assignment. To help support this and other functions performed in the logic, the routing information may still further include, for example, Quality of Service (QoS) information, subscriber information, queue information, peak data rate information, sustained data rate information, latency information, and/or isochronous performance information. In still other implementations, the routing table may include one or more primitive routines that are configured to support the scheduler.

DETAILED DESCRIPTION

Introduction

Figure 1:
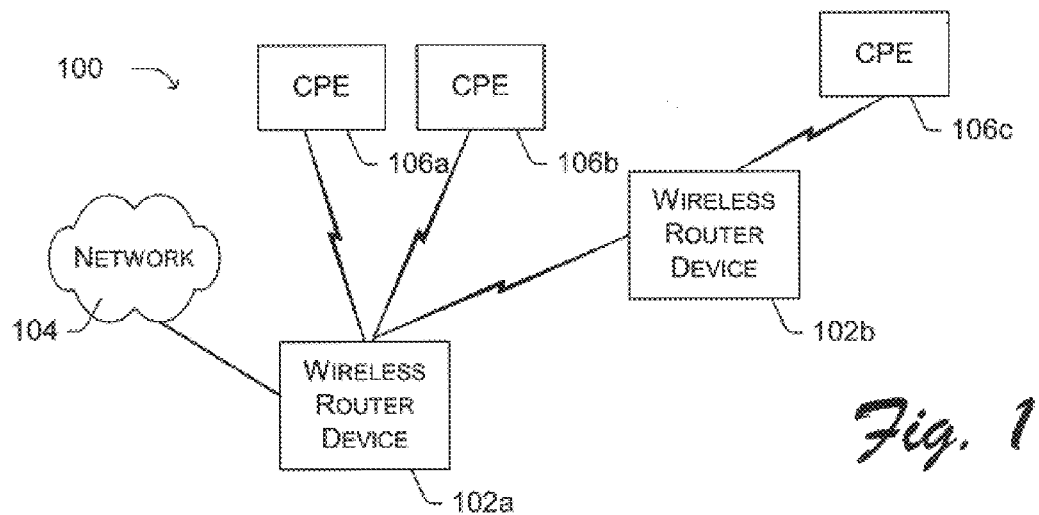
FIG. 1 is a block diagram depicting a wireless network in accordance with certain exemplary implementations of the present invention.

In accordance with certain aspects of the present invention, a wireless routing network is provided. Typically, the wireless routing network would include at least one wireless routing device that is configured to communicate over a wireless communication link with at least one consumer premise equipment (CPE) device. It is expected, however, that most implementations of the wireless routing network will include a plurality of wireless routing devices and CPE devices. When the wireless network includes a plurality of wireless routing devices, then at least a portion of the wireless routing devices are configured to communicate with one another over wireless communication links. In certain implementations, some of the wireless routing devices may also be connected together via a wired communication link.

In this manner, a wireless local area network (WLAN), wireless wide area network (WAN), wireless metropolitan area network (MAN), or other like network arrangement can be provided.

With this in mind, the following description identifies various systems, apparatuses and related methods that may be included in such wireless networks. It should be understood, however, that these are examples only and that not all of the techniques taught herein need be implemented in a given wireless network. Furthermore, those skilled in the art will also recognize that many of the detailed exemplary apparatuses and methods presented herein are also applicable/adaptable for use in other communication systems.

In accordance with certain preferred implementations of the present invention, the wireless routing network provides improved performance over conventional wireless network arrangements by utilizing multibeam receiving/transmitting adaptive antennas, when practical. In certain implementations, simultaneous transmission and reception may occur at a wireless routing device by applying multi-channel techniques. To help accomplish simultaneous transmission and reception, techniques are provided for scheduling and conducting operations even in the presence of either self-interference and/or external interferences. To support the operation of the wireless network, novel storage and discovery techniques have been developed that allow spatial information about the network's nodes, coverage areas and/or potential interference signals to be collected. Accordingly, the wireless routing network provided herein represents a significant improvement over conventional wireless networks that use switched beam and/or omnidirectional antennas.

Terminology

As used herein, the terms "adaptive antenna" refer to an arrangement that includes an antenna array having a plurality of antenna elements, and operatively supporting mechanisms (e.g., circuits, logic, etc.) that are part of a wireless routing device and configured to produce a transmission pattern that selectively places transmission nulls and/or peaks in certain directions within an applicable coverage area. A transmission peak occurs in the transmission pattern when a not insignificant amount of energy is directed in a particular direction. Transmission peaks are, therefore, preferably associated with the path and/or multipaths to a desired receiving node, such as, e.g., another wireless routing device or a CPE device. In some cases, sidelobes may also be considered to represent transmission peaks.

Conversely, a transmission null occurs in the transmission pattern when no transmission of energy occurs in a particular direction, or a relatively insignificant amount of energy is transmitted in a particular direction. Thus, a transmission null is preferably associated with the path or multipaths towards an undesired, possibly interfering, device and/or object. Transmission nulls may also be associated with the intent to maximize power in another direction (i.e., associated with a transmission peak), increase data integrity/security, and/or save power, for example.

The decision to place a transmission null and/or peak in a particular direction is preferably made based on collected (or otherwise provided) routing information. As described in greater detail in subsequent sections, the routing information may include a variety of data associated with the operation of a wireless routing device and other devices at other locations or nodes within the wireless network.

As used herein, the term "logic" refers to hardware, firmware, software, or any combination thereof that may be implemented to perform the logical operations associated with a given task. Such, logic may further include any supporting circuitry that may be required to complete a given task including supportive non-logical operations. For example, "logic" may also include analog circuitry, memory, input/output (I/O) circuitry, interface circuitry, power providing/regulating circuitry, etc.

Wireless Routing Information Using Adaptive Antennas

FIG. 1 depicts an exemplary wireless routing network 100 having two wireless routing devices 102a–b and three CPE devices 106a–c. In this example, wireless routing device 102a is operatively coupled to an external network 104. Here, for example, wireless routing device 102a is connected to network 104 via a wired communication link. External network 104 may be any type of network from which information (e.g., in the form of data packets) is received and to which similar information can be provided. In certain implementations, for example, external network 104 includes the Internet.

As shown, wireless routing device 102a is configured to communicate over wireless links with CPE devices 106a and 106b. Similarly, wireless routing device 102b is configured to communicate over a wireless link to CPE device 106c.

CPE devices 106a–c are representative of any device that is suitable for use in receiving and transmitting information over the applicable wireless link. Hence, in certain exemplary implementations, a CPE device may include a computer or other like device having the requisite communication interfaces.

Figure 2:
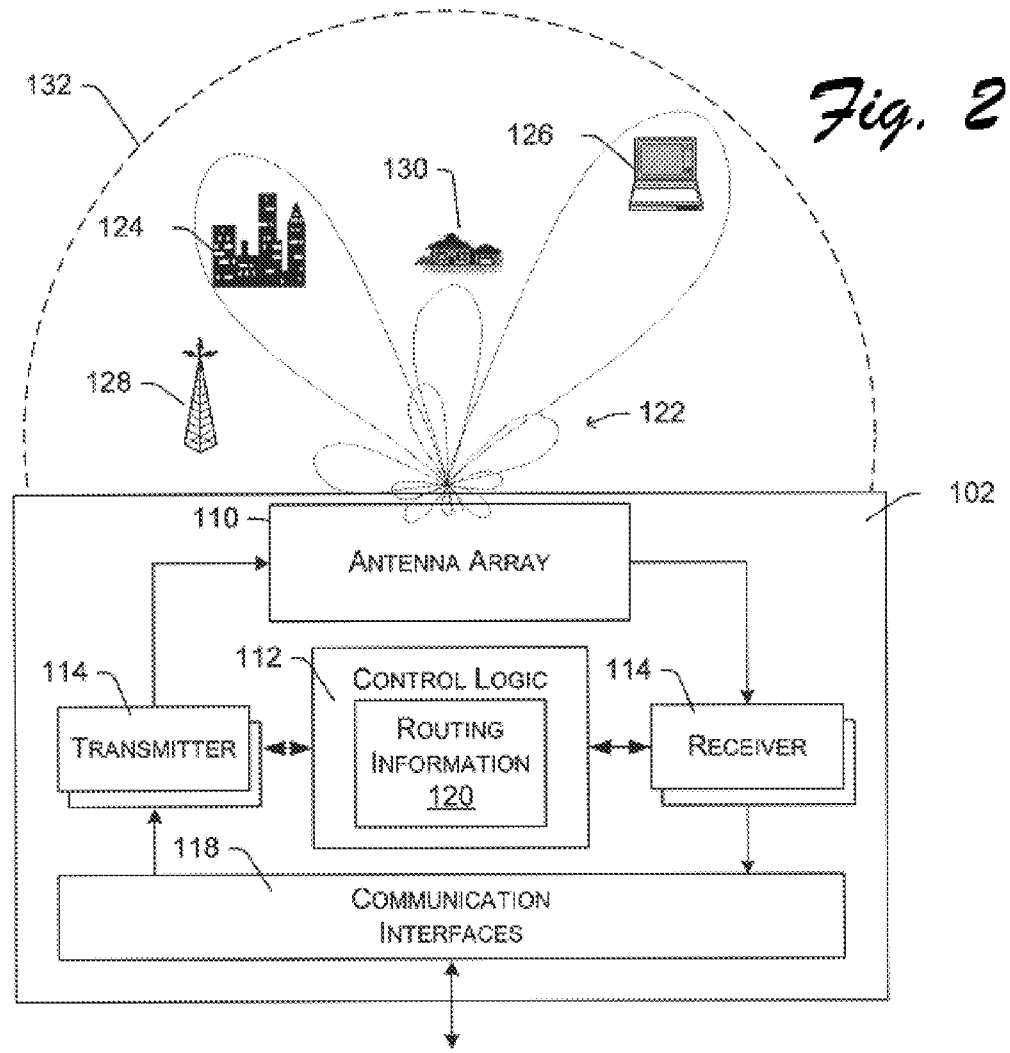
FIG. 2 is a block diagram depicting certain features of a wireless routing device that is suitable for use in a wireless network, for example, as in FIG. 1.

FIG. 2 depicts an exemplary wireless routing device 102 having an adaptive antenna comprising an antenna array 110 and control logic 112. Antenna array 110 and control logic 112 are both coupled to a receiver 114 and a transmitter 116. A communication interface 118 is also provided and coupled to receiver 114 and transmitter 116. Within control logic 112, a block is provided to represent the routing information 120. It should be understood, however, that although illustratively depicted within logic 112, routing information 120 may be maintained in an external memory (not shown). Note that there can be more than one receiver and more than one transmitter. By way of example, in certain implementations a dedicated receiver/transmitter pair is associated with each antenna element within the antenna array.

As illustrated by the lobes of the multibeam pattern 122 emanating from antenna array 110, transmission peaks have been selected so as to illuminate buildings 124 and a mobile user 126 with transmitted energy, while transmission nulls have been selected so as to not significantly illuminate an external transmitter 128 and a residence 130 with any significant amount of transmitted energy even though they are located within a potential coverage area 132. Hence, by selectively and adaptively placing transmission peaks and nulls within potential coverage area 132, information in the form of data packets can be routed through wireless routing network 100.

Routing information 120 may, for example, include desirable transmit power level information, transmit data rate information, antenna pointing direction information, weighting information, constraints information, null/zero location information, peak location information, Quality of Service information, priority information, lifetime information, frequency information, timing information, user and node authentication information, keep out area information, etc., that is associated with each sending/receiving node within the network, or interferers, and the like. In certain implementations, at least some of routing information 120 is maintained within one or more routing tables or like data structure(s).

The purpose of the routing table(s) is to have a storage mechanism that is capable of providing a highly reliable wireless link in the presence of interference and with a provision for a minimization of interference generated. This is important, because the capacity of the wireless network is often limited by the amount or level of interference present. With the adaptability and control techniques provided in the present invention, such limitations may be reduced and most of the effects associated with such interferences ameliorated.

In accordance with certain further aspects of the present invention, the routing table(s) also provides the capability for each routing decision to be based on a point-to-point wireless system design.

By way of example, routing table(s) entries may include all or part of the following information:

IP address (e.g., IPv6) of a node in the wireless network—e.g., as an index,
48-bit unique address—e.g., IEEE 802.1 MAC address,
Protocol ID—e.g., IEEE 802.11, 802.16.1, etc.,
Modulation method,
Connection ID (CID) of a node—e.g., as used in an IEEE 802.16.1 MAC,
Nominal direction to a node—e.g., one or two dimension,
Nominal transmit power level to a node,
Nominal received signal strength indicator (RSSI) level from a node,
Nominal channel to transmit on, and perhaps a backup channel,
Nominal channel to receive on, and perhaps a backup channel,
Nominal transmission data rate, e.g., 6 Mbps—54 Mbps, or as available,
Nominal receive data rate, e.g., 6 Mbps—54 Mbps, or as available,
Known station interference nulls, and
Unknown station interference nulls In accordance with certain implementations, within the structure of control logic 112, the routing table(s) is configured to receive/include data and/or primitives (e.g., function calls) from an Internet Protocol (IP) layer and a medium access control (MAC) layer, and instruct a physical (PHY) layer to provide media access through the MAC layer. Therefore, in certain examples, the routing table(s) is more than simply a data table(s) (or other like structure(s)) since it may also perform or otherwise support certain controlling and/or scheduling functions. Such capabilities are described in greater detail in subsequent sections wherein exemplary demand matrix techniques are presented. Preferably, the PHY and MAC are configured to update entries in the routing table(s) on a dynamic basis utilizing the discovery techniques provided herein. For example, techniques associated with a search receiver as described in subsequent sections.

Figure 3:
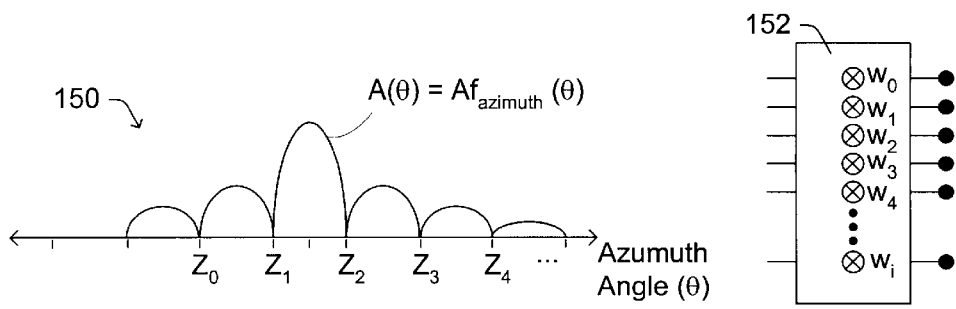
FIG. 3 is block diagram depicting a weighting multiplier function and associated far field transmission pattern amplitude associated therewith, in accordance with certain exemplary implementations of the present invention.

It is noted that the shape of the lobes/sidelobes depicted in FIG. 2 for multibeam pattern 122, are simply illustrative examples. Actual patterns may be described in the form of pattern amplitudes, for example, as a function of azimuth and/or elevation angle. Such patterns may also be described as a function of a sampled data element weighting function or weighting vector associated with the excitation of the elements in antenna array 110. For example, a portion of an exemplary pattern amplitude 150 is depicted in FIG. 3 along with an exemplary weighting factor multiplier 152.

Each of these illustrations represents a description of the form of the pattern or weighting that may be stored in the routing table(s). In the example shown here, the polynomial expansion in z, $w(z)=w_0+w_1z+w_2z^2+w_3z^3+w_4z^4+ \ldots +w_iz^i$ establishes the values of the weights ($w_i$) to be applied to the weight vector. The routing table(s) may store such weighing patterns as a function of θ, or the zeroes of the polynomial, for example. One advantage of zero storage is that the zeros represent directions that should be nulled out to prevent self-interference or possibly interfering with other nodes or possibly other known wireless communication systems, such as, e.g., a WLAN that is not part of wireless routing network 100 but is operating within at least a portion of potential coverage area 132 and frequency bands.

The polynomial expansion in z, w(z) and the zeroes may be calculated from each other; therefore, each may be stored. Updates preferably occur fairly frequently (e.g., in certain implementations, about every millisecond), so a zero storage system may be more advantageous as it is expected that in most environments only a few values will change at a given time. Storing the weighting values will in general require changes to all of the weighting values w(i) when any change in the pattern occurs. Note that w(i) and A(θ) may be expressed as Fourier transform pairs (discrete due to the finite antenna element space). The w(i) is equivalent to a time domain impulse response (e.g., a time domain unit sample response) and the A(θ) the frequency response (e.g., an evaluation of w(z) sampled along a unit circle).

Returning to the exemplary network in FIG. 1, let us assume that wireless routing device 102a has an unobstructed line of sight (LOS) from antenna array 110 to both CPE 106a and 106b, but not to CPE 106c. This can occur, for example, when CPE 106c is located behind one or more buildings (not shown), i.e., CPE 106c is deeply shadow faded (e.g., −50 dB). However, let us assume that wireless routing device 102b is located such that its antenna array 110 can effectively illuminate CPE 106c, either directly (i.e., line of sight) or based on local scattering/diffraction. Consequently, packets that are received by wireless routing device 102a from network 104 for CPE 106c, will need to be routed through wireless packet routing device 102b.

Figure 4:
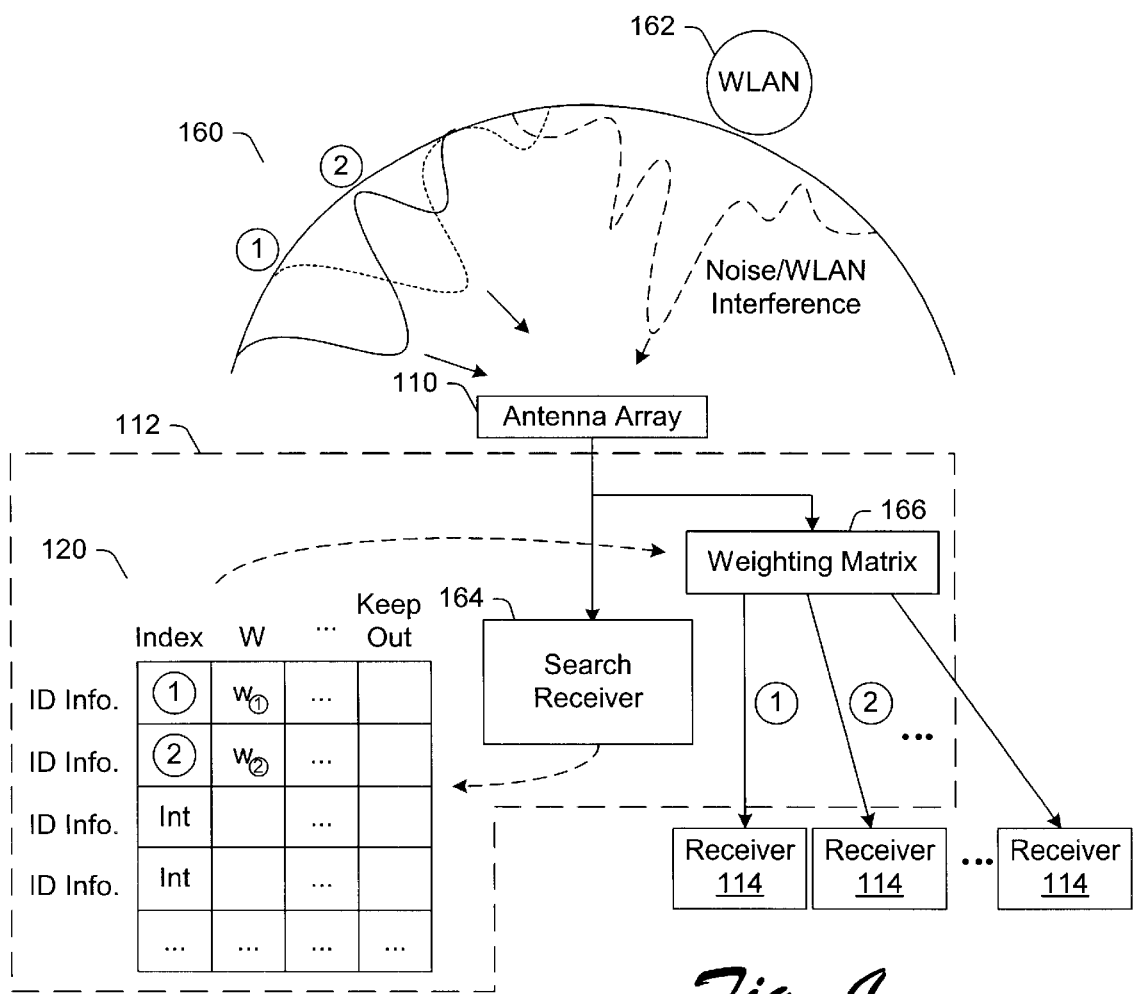
FIG. 4 is an illustrative diagram showing the reception and weighing of various signals by the wireless routing device, for example, as in FIG. 2.

Reference is now made to FIG. 4, which illustratively depicts signals received by a wireless routing device 102 from different sources. Here, for example, it is assumed that signals received from sources 160 are desired signals as they are from other nodes within wireless routing network 100 and that signals such as the noise and WLAN interference associated with another external wireless system 162, are not desired.

These signals, both desired and undesired, are collected by receiving elements within antenna array 110 and are eventually provided to control logic 110. Note, while not important for the purposes illustrated in this example, receivers 114 actually provide the received signals to control logic 110.

Here, control logic 112 includes a search receiver 164 that is configured to update routing information 120 with regard to the received signals. For example, search receiver 164 may identify information about different classes of interferers (e.g., known and unknown types) within routing information 120. In this example, routing information 120 includes a connection indexed routing table(s) based on identification information, such as, e.g., address information, CID, etc. The routing table(s) includes identifiers of the desired sources and other identifiers for the interferers (Int). Further included in the routing table(s) are stored weighting values (w). Other information such as "keep out" identifiers, which are described in later sections, are also included in this exemplary routing table(s).

The stored weighting values associated with each connection/source are utilized in a weighting matrix 166. Weighting matrix 166 operates so as to apply the latest weighting values to the received signals and also to transmitted signals. In this illustrative example, subsequently received signals will be processed using the most recent weighting values in the weighting matrix.

Thus, as described above and in subsequent sections, wireless routing device 102 is essentially configured to control the transmission amplitude frequency band and directionality of data packets to other nodes and assist in reducing the effects associated with received noise and interference (e.g., self interference and/or external interference). This is accomplished with control logic 112 within wireless routing device 102.

Control logic 112 is further configured to schedule the timing of transmissions and receptions. Indeed, in certain implementations, control logic 112 is configured to operate in an intelligent manner so as to not interfere with other wireless systems such as, for example, WLAN 162. One way to accomplish this added benefit is for search receiver 164 to further identify appropriate times for transmission of signals that might otherwise interfere with the other system.

Multibeam Packet Switching Techniques for RTS/CTS Systems

Time division duplex (TDD) techniques call for transmissions and receptions to occur over the same frequency band. Conducting TDD in a multibeam transmitting system introduces a problem in that reception cannot occur when any beam is being used for a transmission. Since TDD reuses the same antenna, the transmit-receive interference tends to be severe. Recent contributions to the IEEE 802.16 MAC for multibeam, raise the case of TDD in multibeam but do not provide a solution.

One solution is to identify a "primary" transmit path. At all times, for example, a radio resource managing mechanism or search receiver (not shown here, but included in control logic 112) can be configured to identify the IP packet stream that has the highest quality of service (QoS) and/or packet transmission usage, and then consider this stream the "primary" stream. Whenever the primary stream is present, "secondary" streams may simultaneously transmit on the same antenna array. Then, as time goes on, other streams may be identified and considered as being the "primary" stream. Thus, there is always a primary stream, when the clear to send (CTS) protocol has determined that reception must occur.

A settable duty cycle can be employed to allow reverse traffic to occur. By establishing numbers for a duty cycle on a priority basis, for example, the contention and reverse link can be made available. By applying such a solution to a request to send (RTS)/CTS network, all routing devices within the RTS/CTS network can be configured to work in the same manner. Here, interference nulls may be used to reduce simultaneous un-synchronized transmissions.

The previous solution/system may be further expanded to have a pair or more of spatially separated wireless routing devices at one location or node. For example, a separation of about 20 wavelengths may be provided between antenna arrays. The routing devices can allow a higher percentage of receive time using one of the antenna arrays, and also provide the potential of simultaneous transmit streams from the same approximate site. In certain implementations, Multiple Input Multiple Output (MIMO), mesh forwarding and transmit/receive antenna separation may all be provided simultaneously. Moreover, transmit and receive may be swapped for improved diversity reception. Thus, MIMO, mesh forwarding, simultaneous transmit/receive using TDD and spatial diversity may be implemented.

Improved Clear Channel Assessment (CCA) for Adaptive Antenna Systems

A problem exists with steered beams. Routing devices cannot typically hear other routing device traffic due to the narrowness of the beams being used. However, in accordance with certain aspects of the present invention, wireless routing device 102 may be configured to cross-correlate headers within packets. Therefore, the potential for contention during access can be reduced by having wireless routing devices that essentially listen and cross-correlate headers. If a header is received, then wireless routing device waits a period of time before transmitting. Here, the header receive sensitivity may be somewhat greater than the data sensitivity.

This type of system may not work when the wireless routing device is located within a transmission null. When synchronized with a local clock, time division multiple access (TDMA) techniques may be employed to further improve the reliability of a transmission being made during the time at which a receiver is available to receive the signal.

Adaptive antennas may further aggravate collisions that occur during contention periods, subsequent uplinks, and/or receptions in a peer-to-peer network. This is often the result of clear channel assessment failures when transmitting nodes do not hear each other. In IEEE 802.11b network communications, for example, CCA has three modes of operation, power level (energy detection), carrier sense with timer, and/or a combination thereof. Thus, in a TDD system, as soon as one node transmits, subsequent collisions cannot be detected. The network capacity may therefore be reduced when latency increases due to such collisions.

One solution to this problem is to add an adaptive antenna at the receiving node and configure it to reject the nearby interference (e.g., nearby in angle). Unfortunately, the size of such an antenna can become very large because the redirection of nearby angles, for line of sight propagation, is proportional to $\lambda/L$ in radians, where L is the width of the receiving antenna array panel.

Figure 5A:
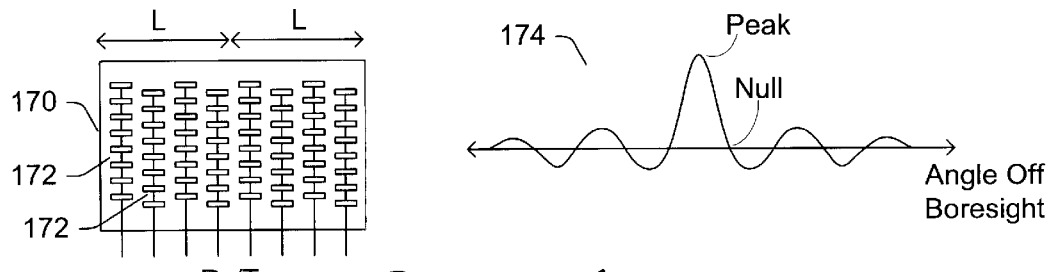
FIG. 5A and FIG. 5B illustrate exemplary antenna array panels and graphs that illustrate an approximate uniform distribution pattern associated therewith.

An exemplary adaptive antenna panel 170 is depicted in FIG. 5A, as having a plurality of antenna elements 172 (arranged "vertically" in this example). The accompanying graph illustrates an approximate uniform distribution pattern 174 associated with antenna panel 170. Other distributions may be performed.

Figure 5B:
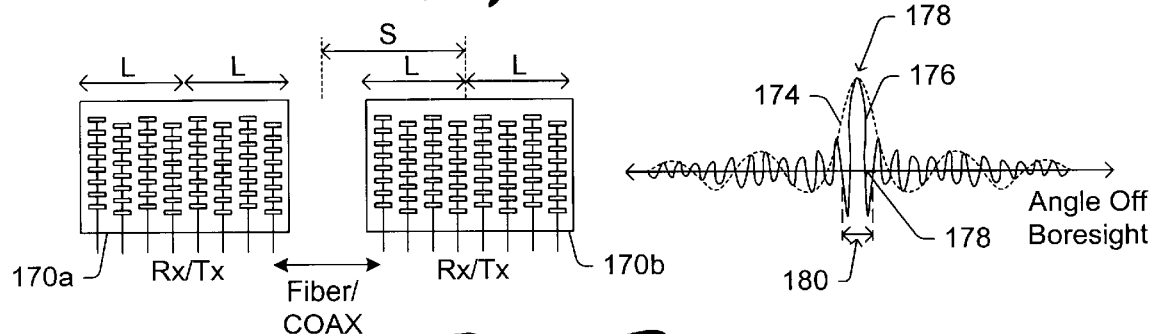

One possible solution involves the placement of a second antenna array panel next to the first, for example, as depicted in FIG. 5B. Here, there is a separation S between panels 170a and 170b and the associated receivers/transmitters are operatively coupled together, for example, via a wired connection. The pattern of the antenna is approximated by line 176. Line 174 is also depicted for comparison. Signals are preferably placed at point 178, with a $\lambda/2S$ angle off boresight separation 180. With this arrangement, closely-spaced nulls may be placed within the beam of any individual antenna element. Adjustment of the relative phase of the two antenna arrays moves the reception/transmission nulls and peaks across the main aperture shape represented by line 174.

One problem with the preceding example is the attendant cost of deploying a second antenna array. An improvement to the overall situation results if the antenna elements 172 may be selectively configured to operate as transmit and/or receive antennas. In accordance with certain aspects of the present invention, for example, two antenna elements may be simultaneously transmitting on the same or separate frequencies, either to non line of sight nodes, for example, using local diffracting scatterers (same frequency) or using the phasing technique as described above, but now in the transmit mode. Additionally, both antenna elements may be used in receive mode as previously described.

In still further implementations, one antenna element may be configured to transmit while another antenna element is configured to receive, but on a separated frequency band so as to prevent adjacent channel power from significantly coupling to the receiving antenna element. A plurality of antenna arrays may also be employed in the same way to further extend performance.

In accordance with certain further aspects of the present invention, nulling of potentially colliding data packets can be achieved, for example, through the use of fast Fourier transforms (FFTs) (e.g., for signal processing and searching for direction of arrival (DOA)), a COordinate Rotation DIgital Computer (CORDIC) algorithm (for trigonometric calculations), and a flexible aperture distribution. Aperture distribution is preferably chosen, in such examples, to change the frequency of the angular peaks/nulls (or spacing of peaks/nulls) to improve interference reduction. In cost sensitive deployments and/or restricted areas, the deployment of one antenna array may be possible. All of the aperture illumination possibilities will exist, however, with resulting wider peak/null spacing.

Unwanted coupling may also be reduced/controlled by varying the aperture of the antenna array. In the examples shown above, each of the "vertical" columns of antenna elements are driven together within the antenna array. However, in accordance with certain further implementations, illuminating only a smaller selected portion of an antenna array may prove to be advantageous, since doing so tends to provide a "quiet" area for nearby receive elements. One drawback is that the forward gain will be reduced. By way of example, in certain implementations there is about a 3 dB reception loss and about a 3 dB transmission loss.

Figure 5C:
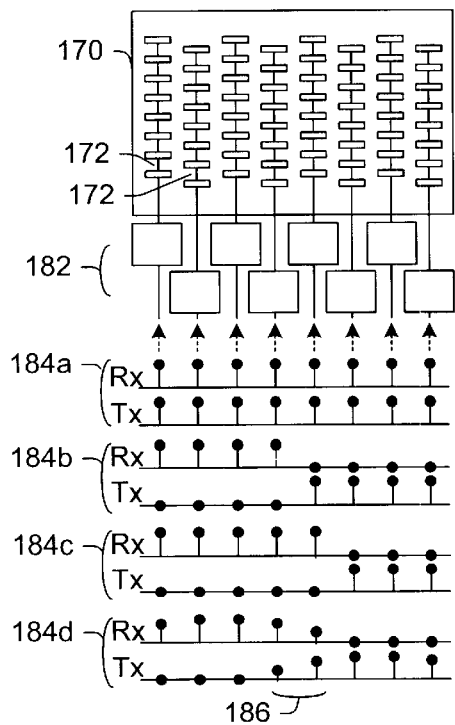
FIG. 5C is a block diagram depicting an antenna array panel, for example as in FIG. 5A, that is coupled to a plurality of receivers/transmitters and various input weighting value pairs.

With this in mind, attention is drawn to FIG. 5C, which depicts antenna array 170 having a plurality of antenna elements 172. Antenna elements 172 are operatively coupled to corresponding receivers/transmitters 182.

Also depicted in the illustrative diagram are several exemplary sets 184a–d of corresponding set element weighting values. In the first set 184a, each of the columns of elements is utilized during transmission and reception as a result of the positive weighting values associated with each column.

The second set 184b demonstrates a modified use of the columns of elements during transmission and reception. Here, half of the columns are weighted for transmitting signals. The remaining half of the columns are weighted for receiving signals. The hardware to accomplish this type of partial element illumination is in place in a conventional TDD transmit/receive RF elements, with the a modification that some of the receivers need to operate while the other columns of elements are transmitting.

The reason for the lower gain is due to the smaller aperture illumined by the modified receive/transmit simultaneous arrangement.

In accordance with certain implementations, this type of simultaneous receive/transmit allows for the reception of acknowledgement (ACK) signals, Contention Frame END (CF-END) signals, and other like control signals associated the MAC, while simultaneously transmitting out of the same antenna array 170.

Coupling between the receiving and transmitting columns of elements can be controlled, for example, through a combination of isolation and OFDM tone reduction to allow for sensitive reception of the control signals.

As illustrated by set 184c, the element illumination need not be equal between transmit and receive. Here, more columns of elements are weighted for transmission than receive. This is useful in situations where the gain of the receiver or of the transmitter is needed separately for the link budget. Thus, for example, the resulting receiver "illumination" can be used to describe element weighting in the sense of the Lorentz reciprocity theorem, i.e., that all current weightings of the receive array are equivalent to the transmit illumination.

This type of variable illumination may be performed, when needed, for example, when a control node is being sought by a receiving node.

Each of the multiple transmit beams produced by the antenna array may be separately illuminated to further reduce unwanted receive signal coupling. Beams on adjacent channels may be fully or partially illuminated to reduce the likelihood of out of band signals appearing on a received signal. Alternate (i.e., non-adjacent) channels typically do not couple as much energy as an adjacent channel and thus should not require as much reduction in antenna gain through partial illumination.

As illustratively depicted with the third exemplary set 184d of element weighting values, in certain implementations, the element weighting may overlap if reception/transmission is capable of being conducted simultaneously. Furthermore, as shown, the element weighting values need not be uniform.

Figure 5D:
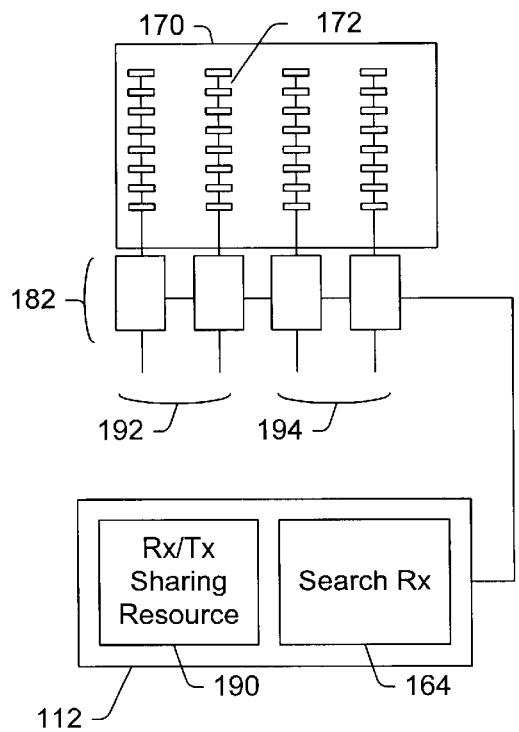
FIG. 5D is a block diagram depicting logic, including a search receiver, that is operatively coupled to a plurality of receivers/transmitters, for example, as in FIG. 5C.

In FIG. 5D a plurality of receivers/transmitters 182 area depicted as being operatively coupled to logic 112, which includes receiver/transmitter sharing resource 190 and search receiver 164. Here, for example, a first subset 192 of receivers/transmitters 182 and associated antenna elements 172 are configured to transmit and a second subset 194 of receivers/transmitters 182 and associated antenna elements 172 are configured to receive.

Search receiver 164 in this example is configured to operate on the base band element data to extract information from received signals, such as, e.g., PLCP headers that are received from any direction, within the element pattern. In certain exemplary implementations, search receiver 164 includes at least one FFT (not shown) performing spatial conversion from the element domain to an angle domain. This "spatial FFT" can be configured, as in this example, to only process signals from the elements that are in the portion of the array that is "quiet" with regard to the transmitted signals.

Receiver/transmitter sharing resource 190 is configured to selectively control the operating mode, i.e., transmit mode and receive mode, of each of the receivers/transmitters 182.

Antenna element orientation may produce linear or circularly polarized signals polarized. For example, laptop computers with wireless PCMCIA cards tend towards a horizontal polarization pattern. The elements in the antenna array may be rotated to provide an optimum horizontally polarized signal, or diagonal polarization. Circular polarization may be used to prevent nulls from appearing in the signal pattern. Reflection from oblique surfaces tends to change the sense of linear polarization. Circular polarization is usually right-hand-sense to left-hand-sense converted on reflection. Therefore, a circular polarized to linear polarized signal will likely sacrifice about 3 dB for a reduction in polarization cancellation upon reflection.

RTS/CTS Contention Period Alerts to Ameliorate Near-Far Problems

A problem exists involving near-far interference and the inability of some nodes to hear CTS packets. Assume, for example, that a node A and a node B are close and potentially interfere with one another due to sidelobe energy. Nodes A and B, however, may not be able to hear CTS packets transmitted from a node C and a node D, to nodes B and node A, respectively. Therefore, node B may interfere with node A during a download from node C to node A.

One solution to this problem is for node A and node B to keep a table of directions and power needed to "alert" nearby stations of the CTS packets sent, for example, to node C from node A. Here, the beam shape of the CTS alert may be omnidirectional or directed. Omnidirectional transmission, which will likely cause more interference, currently requires a lower Federal Communications Commission (FCC) power limit due to point-to-multipoint rules and therefore results in directed beams from node A to node B during CTS, for example. A simplified approach is to retain information on the effectiveness of the node A to node B path for particular node A to node C beams generated, and use the normal sidelobes of node A to ensure that node B receives the CTS that node A is sending to node C. After the CTS packet is received at node B from node A, the nulling techniques available at node A may then be used to reject interference coming from node B. Knowledge of node B's interference generation at node A in some cases allows node A to not send the CTS to node B at all. In this case, node B must adhere to known beam shapes that have adequate nulls toward node A.

Figure 6:
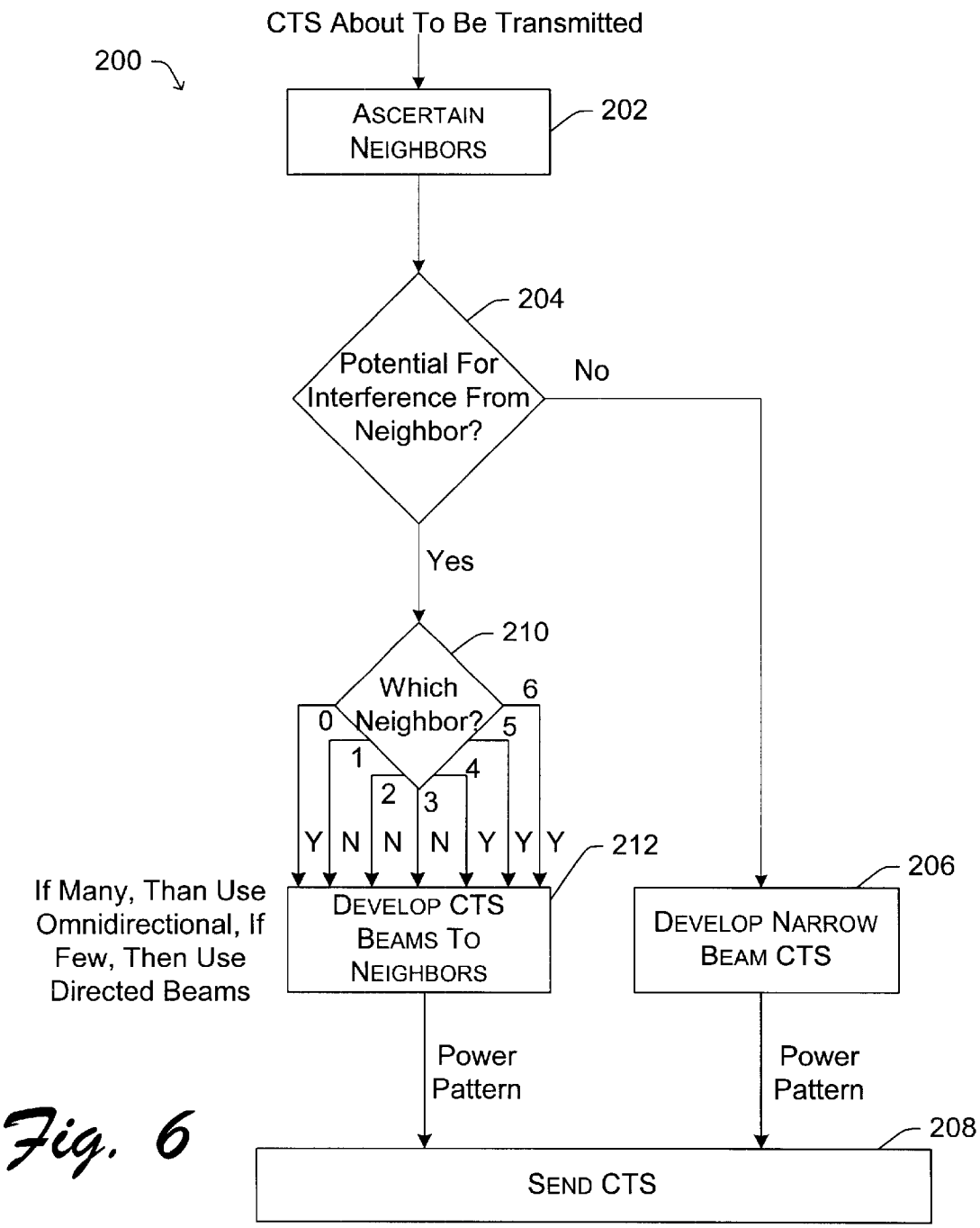
FIG. 6 is a flow diagram depicting a process for selectively developing CTS is transmission beams, in accordance with certain exemplary implementations of the present invention.

FIG. 6 depicts a flow diagram of a process 200 associated with the above techniques. Process 200 may, for example, be implemented in control logic 112. In this example the CTS is about to be transmitted. In step 202, the neighboring nodes are ascertained, for example, from stored historical routing information. In step 204, a decision is made as to whether there is a potential for interference from a neighboring node. If it is determined that there is no potential for significant interference, then in step 206 a narrow CTS power beam is developed and then transmitted in step 208. Conversely, if it is determined in step 204 that there is a potential for significant interference, then another decision is made in step 210 to determine which nodes to transmit to. Here, for example, there are seven nodes, numbered 0–6, of which only nodes 1 and 2 are not to receive to the CTS. Next, in step 212, applicable beam(s) are developed for the CTS transmission. In step 208, the CTS is transmitted.

Essentially, if there are many receiving nodes and a potential for interference then an omnidirectional or like transmission may be used, otherwise if there is only a few receiving nodes, then a narrower beam may be used to transmit the CTS message.

CTS signals are an example of control signals used to control subsequent transmissions. Other signals that establish transmission queuing and back-off times may be used. For example, a point coordination function or a hybrid coordination function may be employed.

TDD/FDD and Quiet Time Techniques

Finding two separated bands to establish a frequency dependent duplex (FDD) communication is often difficult. Regulatory agencies are not always able to provide sufficiently separated channels to not require undue efforts to provide the transmit signal from de-sensing the received signal. An additional problem arises when a wireless routing device must transmit multiple beams on the same frequency, or band of frequencies, at the same time from the same antenna array or node. The combination of several leakage power levels to an alternate channel tends to raise the noise level.

One solution to this problem is to separate the receive and transmit frequencies adequately enough to reduce the leakage by filtering. At that point the receive and transmit antennas may be combined, thereby possibly reducing the size of the requisite antenna array panel.

Another problem is introduced because it is possible that the power and modulation rules in the further separate band does not match the rule in the main transmit band and therefore two-way communication may not be possible. For example, the FCC has indicated acceptance of point-to-point links using steered beams in the 5.7 GHz U-NII band up to 1 watt with a 23 dBi gain antenna. However, the 5.3 GHz U-NII outdoor/indoor band only allows 0.25 watts to a 6 dBi antenna. If a 6 dBi antenna is used for the transmission and reception of the 5.3 GHz node, then the 5.3 GHz link has a 40 dB disadvantage compared to the 5.7 GHz link. The 5.7

GHz link likely may increase the receiving antenna gain beyond 23 dBi, requiring a larger antenna. The 5.3 GHz receiving antenna can easily increase phased array gain above 6 dBi. Phased arrays at these frequencies commonly reach much higher gains and tend to be compact. Therefore, unfortunately, the 5.3 GHz link may have a link disadvantage somewhat greater than 20 dBi.

One solution to the above problem is to change the larger-smaller reverse link to 5.7 GHz during "quiet times" of the multibeam 5.7 GHz transmitter. In addition, the 5.7 GHz reverse signal may be spread to allow it to be effective below the noise of the spurious signals generated by the alternate channels. In the first case, for example, the MAC of the 5.7 GHz transmitter may be programmed to provide an interval of quiet time equal to at lease twice the maximum expected propagation delay. Thus, a distant node can then listen to the forwarded signals from the 5.7 GHz transmitter, waiting for a quiet time alert, and then begin transmitting on a determined quiet 5.7 GHz channel that is reversed for this purpose.

A multibeam wireless routing device using a phased array transmits beams in several directions and may not be able to alert all nodes that a quiet time is about to occur. However, a very brief transmission to all potentially transmitting nodes, e.g., those that do not have high signal to noise ratio SNR return links, is possible. In other words, the quiet time alert generated by the MAC need only be sent out only in the directions needed by those nodes operating their transmitters on 5.7 GHz.

The use of 5.3 GHz for the reverse link also frees up the 5.7 GHz band for additional transmissions from the 5.7 GHz receiving nodes, when a node has not received an RTS.

The overall network capacity is actually increased because the 5.7 GHz band may be reused, for example, by node B to transmit to node D which may be out of range of node A. The lack of an RTS or other announcement of 5.7 GHz signals that may be received by node B allows node B to re-use the frequency or frequencies within the 5.7 GHz band.

Other frequency bands may be used, for example, bands separated adequately at 2.6 GHz may be used. In addition, another unlicensed frequency band such as 2.4 GHz may be used with the same FDD/TDD construct. The resulting network/nodes may employ FDD, TDD, frequency simplex division duplex (FSDD), or other like techniques. The routing table(s) or like routing information structure(s) used by each wireless routing device 102 would therefore, include the information that is dynamically generated and which preferably tends to optimize communication with nearby nodes.

Consequently, in the example above, an algorithm may be used to handle node D, due to it being a weak node, (e.g., being unable to respond on 5.3 GHz). During a quiet time alert, node D may respond to the wireless routing device at 5.7 GHz while one channel is sufficiently quiet to get a signal through. Here, all signals may be single carrier, orthogonal frequency division multiplexing modulation (OFDM), or spread spectrum. For example, by using spread spectrum a signal has a higher probability of being received through interference. However, one disadvantage is that the data bit rate tends to be lower for the same occupied bandwidth.

The normal expectation of a quiet period on a channel sufficiently separated from the forward transmissions is that it will allow reverse traffic in the same band. This is useful when the 5.3 GHz band is unable to get through due to its lower effective isotropic radiated power (EIRP) allowance. The distant node is then allowed to reuse 5.3 GHz for other forwarding purposes to other nodes.

Polarization Nulling

Figure 7:
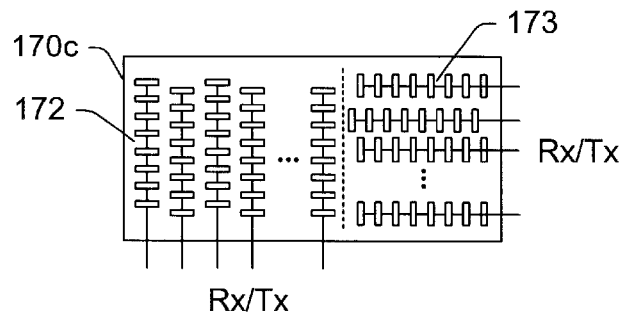
FIG. 7 illustrates an antenna array panel having different polarized elements, in accordance with certain exemplary implementations of the present invention.

Another solution to the reverse link in the same frequency band is to select opposite polarization within an antenna array. This is depicted in FIG. 7, for example, wherein an antenna panel 170c includes "vertical" polarization elements 172 and "horizontal" polarization elements 173. Given this configuration, selective use of the opposing polarized elements in antenna array will allow for nulling to occur during transmission, thus allowing the re-use of the 5.7 GHz band.

Consequently, a combination of low phase noise, low modulation sidebands, one or two channel frequency separation, polarization, and/or distance separation will advantageously allow for re-use of the same frequency band.

Delayed Cancellation Techniques

To further improve the receive sensitivity of wireless routing device 102 in various directions while transmitting in other directions in the same frequency band, the artifacts of unwanted coupling between an applicable transmitter 116 and receiver 114 at antenna array 110 can be reduced by recognizing the artifacts in the received signal and significantly canceling them out. Doing so effectively will allow for selected simultaneous transmission and reception at the same frequency.

An example is provided herein for OFDM signals. Those skilled in the art will, however, recognize that the techniques applied in this example are adaptable to other types of signals too.

Figure 8A:
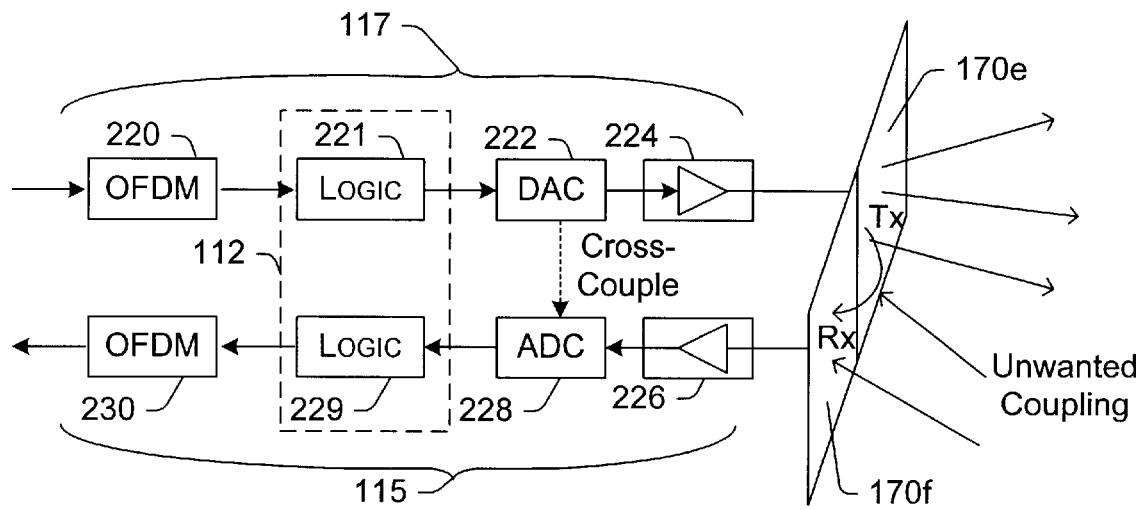
FIG. 8A is a block diagram depicting a transmission path and reception path configured to reduce unwanted coupling between antenna elements, in accordance with certain exemplary implementations of the present invention.

In a first exemplary solution, a delayed version of the transmitted signal is digitally subtracted from the received signal to remove undesired coupling artifacts. The block diagram in FIG. 8A illustratively depicts a transmission path 117 and reception path 115, which are both coupled to transmit antenna elements 170e and a receive antenna elements 170f, respectively.

Transmission path 117 includes an OFDM modem 220 that converts data to be transmitted into a corresponding OFDM data. The OFDM data is then provided to spatial processing logic 221, which is configured to establish the applicable peaks and nulls for the transmission. Here, the resulting spatially processed OFDM data is then provided to the input of a digital to analog converter (DAC) 222, wherein a corresponding analog signal is produced. The output of DAC 222 is then provided to an up converter 224, which prepares and amplifies the analog signal for transmission and provides the resulting adaptive array signals to transmit antenna elements 170e.

Reception path 115 includes a down converter 226, which is configured to process the signal received by antenna elements 170f. The output of down converter 226 is provided to an analog to digital converter (ADC) 228, which converts the analog signal from down converter 226. The resulting digital data output from ADC 228 is then provided to spatial processing logic 229 for further spatial processing. The resulting spatially processed data is then provided to an OFDM modem 230 for further conversion.

As illustrated, there may be unwanted coupling between antenna elements 170e and 170f. However, if the resolution of ADC 228 and DAC 222 is sufficient, this unwanted coupling may be reduced through cross-coupling which essentially subtracts each OFDM tone from the resultant received data. In certain implementations, for example, it is possible to obtain about a 40 dB rejection of the transmitted signal in reception path 115, thereby allowing re-use of the same frequency band. As such, noise signals associated with the sidebands in the transmitted signal can be significantly canceled out. This sideband noise is essentially deterministic based on an amplifier model and having the transmitted signal itself applied to the amplifier model.

Figure 8B:
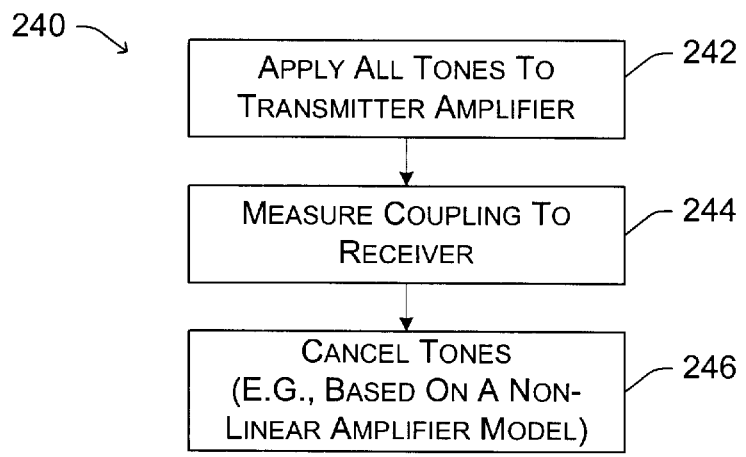
FIG. 8B is a flow diagram depicting a process associated with FIG. 8A.

FIG. 8B is a flow diagram that further illustrates a process 240 associated with this type of delayed cancellation technique. In step 242, all of the tones are applied to up converter 224. In step 244, the coupling to reception path 115 is measured by cross-coupling the output of DAC 222 to ADC 228. Then in step 246, the OFDM tones based on a non-linear amplifier model are cancelled out, for example, within ADC 228.

In accordance with certain further exemplary implementations of the present invention, another similar delayed cancellation technique includes measuring each OFDM tone that is being transmitted with an auxiliary receiver, and then canceling out measured/scaled tones in the received signal. In this manner, the actual substantially instantaneous adaptive array signals are measured and then cancelled out. The cancellation of unwanted tones can be based on learned scale factors provided by a deriving engine.

Figure 9A:
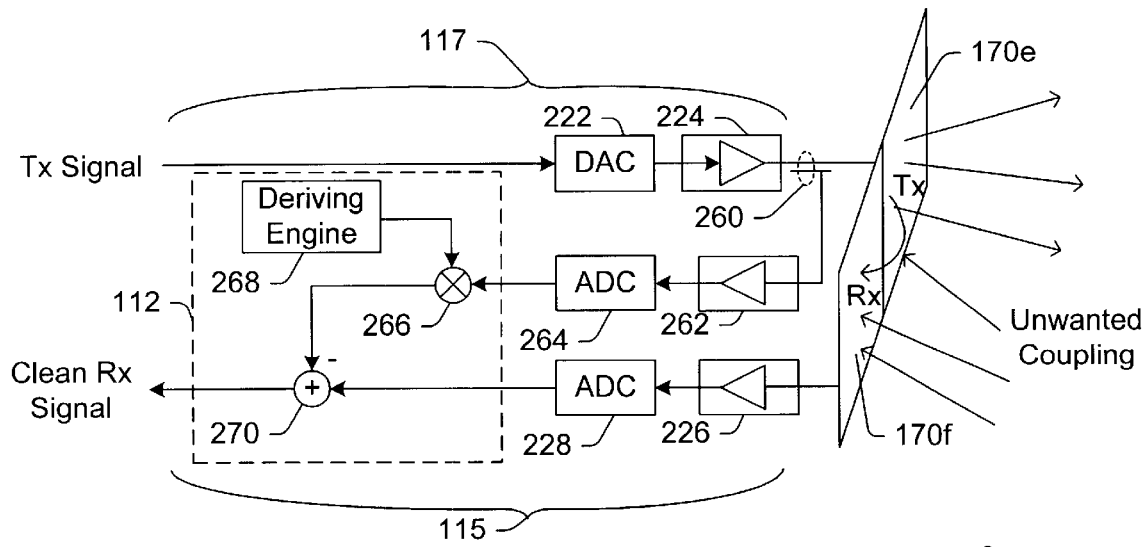
FIG. 9A is a block diagram depicting a transmission path and reception path configured to reduce unwanted coupling between antenna elements, in accordance with certain further exemplary implementations of the present invention.

FIG. 9A illustrates an exemplary arrangement for accomplishing such tasks. Here, a directional coupler 260 or like mechanism is configured to tap into the output (i.e., the adaptive array signals) from up converter 224 in transmission path 117.

A sampled adaptive array signal is then provided, as shown in this example, to an auxiliary receiver that includes a down converter 262 and an ADC 264. The output from amplifier 262 is provided to ADC 264. The output of ADC 264 is then provided to a multiplier 266, wherein the digital signal is scaled according to scale factors provided by a deriving engine 268. Each of the scale factors is associated a different OFDM tone and determined or learned by deriving engine 268 during a testing phase wherein all of the tones are transmitted and the resulting coupling at the antenna panel is measured. In certain implementations, for example, a short testing phase is conducted every few minutes or so.

The output from multiplier 266 is then provided to a negative input of a combiner 270 and therein combined with the output from ADC 228, which is the digital equivalent of the received signal as processed by down converter 226. In this manner, the scaled tones associated with the tapped transmission signal are significantly removed from the received signal to produce a substantially "clean" received signal. This can be accomplished for each adaptive array signal.

Figure 9B:
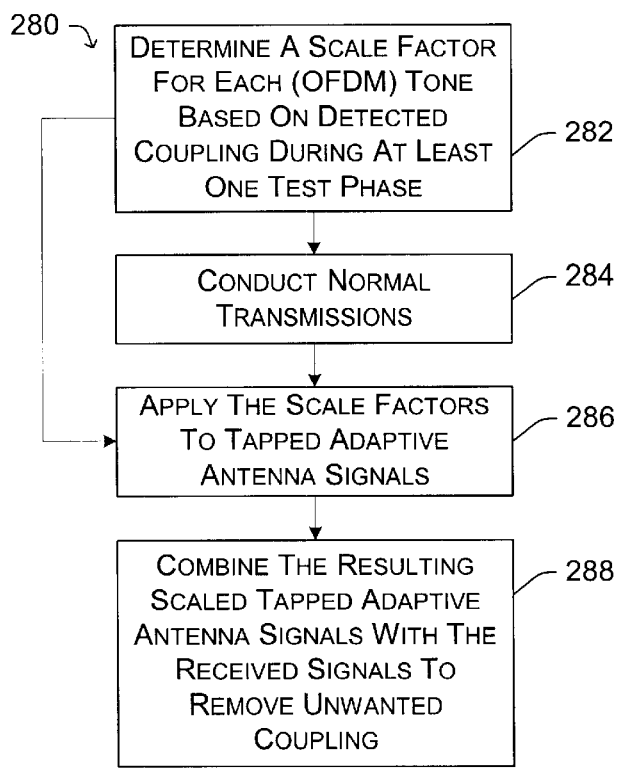
FIG. 9B is a flow diagram depicting a process associated with FIG. 9A.

FIG. 9B illustrates an exemplary process 280 for the above technique. Here, in step 282, during a testing phase, the coupling between antenna panels is detected for each OFDM tone by transmitting all OFDM tones, and corresponding scale factors are determined. Next, in step 284, normal transmissions are conducted and adaptive array signals are tapped. In step 286, the scale factors are applied to the tapped signals to produce corresponding scaled tapped adaptive array signals. In step 288, the scaled tapped adaptive array signals are then combined with corresponding received signals, thereby causing unwanted coupling from the transmitted signals to be significantly rejected. The resulting "clean" receive signals can then be further processed as required.

Figure 10A:
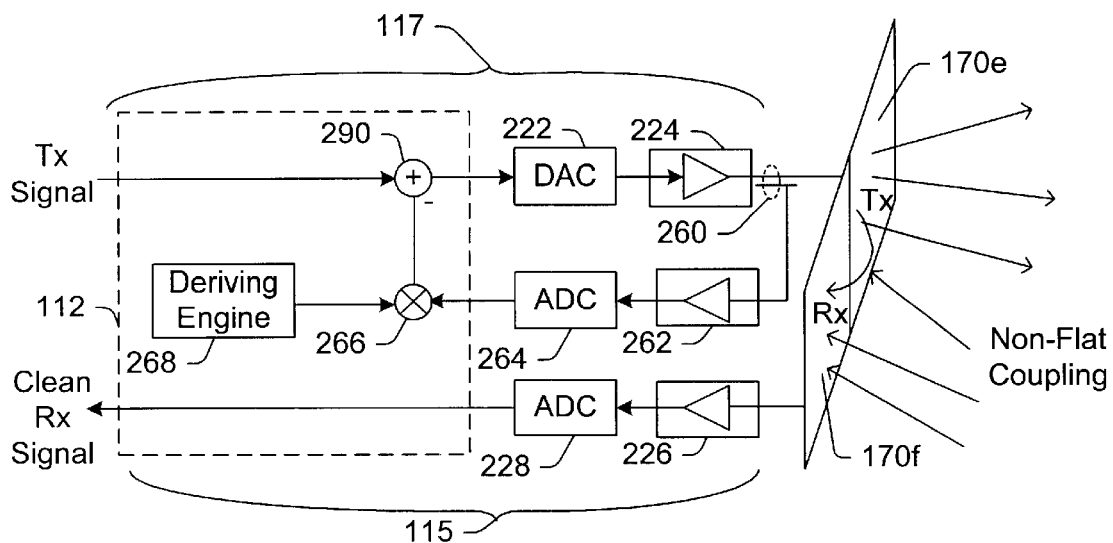
FIG. 10A is a block diagram depicting a transmission path and reception path configured to reduce unwanted coupling between antenna elements, in accordance with certain other exemplary implementations of the present invention.

In accordance with further aspects of the present invention, unwanted coupling may be significantly reduced by instead modifying OFDM tones in transmitter 116, prior to transmission. An exemplary arrangement for accomplishing this task is depicted in FIG. 10A.

Here, a tapped adaptive array signal (which has been digitized by ADC 264) is scaled, as in the previous example, by multiplier 266 using a learned scale factor, for example, as determined by deriving engine 268 during a testing phase. Then the resulting scaled tapped adaptive array signal is then fed back to a combiner 290 in transmission path 117. The resulting combination of the signal to be transmitted and the scaled tapped adaptive array signal tends to reduce unwanted coupling between the antenna elements 170e and 170f when the adaptive array signal from up converter 224 is subsequently transmitted.

Figure 10B:
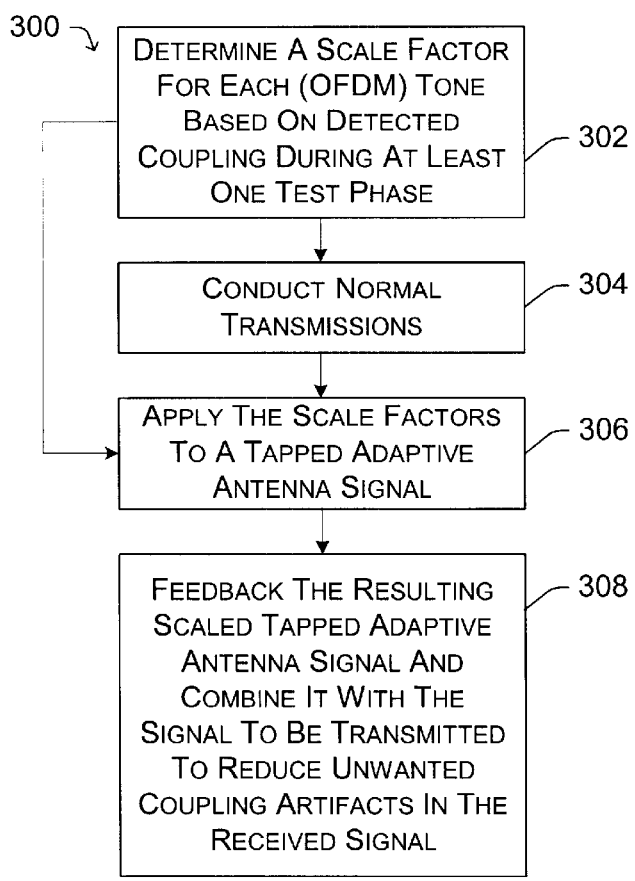
FIG. 10B is a flow diagram depicting a process associated with FIG. 10A.

FIG. 10B is a flow diagram depicting an exemplary process 300 for reducing unwanted coupling between transmit antenna elements 170e and receive antenna elements 170f. In step 302, a scale factor is determined for each OFDM tone based on unwanted coupling detected during one or more test phases. In step 304, normal transmission of at least one adaptive array signal begins. However, in step 306, the scale factor determined in step 302 is applied to a tapped and digitized version of the adaptive array signal in step 304. The resulting scaled tapped adaptive array signal in step 306 is then fed back and combined with the digital signal, which is subsequently being transmitted as the adaptive array signal. The combining process in step 308 is configured to produce a modified digital signal that is then converted to an analog signal by DAC 222 and further processed by up converter 224 to produce a modified adaptive array signal. The modified adaptive array signal is transmitted using antenna elements 170e and is also tapped in accordance with step 306. As a result of process 300, the transmission of the modified adaptive array signal significantly reduces unwanted coupling and associated artifacts within signals received using antenna panel 170f.

It should be recognized, however, that while the above exemplary delayed cancellation methods and apparatuses provide additional benefit to certain implementations of the present invention, such delayed cancellation techniques are not necessary to practice the present invention. Furthermore, it is noted that the above delayed cancellation techniques are not limited to OFDM systems, but are clearly adaptable to other systems wherein unwanted coupling between transmit and receive antennas may exist.

Figure 11A:
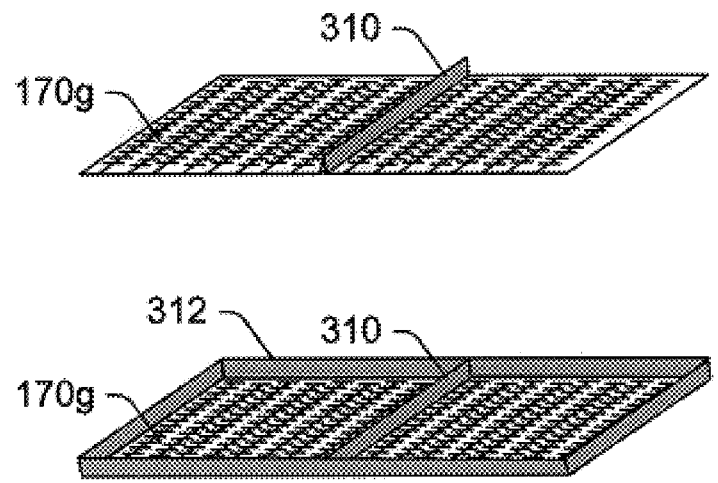
FIG. 11A and FIG. 11B illustrate the use of a barrier with an antenna array panel configured to reduce unwanted coupling between antenna elements, in accordance with certain exemplary implementations of the present invention.

In accordance with certain other aspects of the present invention, introducing electromagnetic absorbing and/or reflecting materials near to the antenna elements can reduce unwanted coupling between a receiver and transmitter. By way of example, the illustration at the top of FIG. 11A shows a barrier 310 that includes electromagnetic absorbing and/or reflecting materials. Here, barrier 310 essentially divides antenna array 170g into two portions. When maximum isolation is required between a receiver and transmitter, then the receiving and transmitting elements should be selected such that they are separated by barrier 310. The illustration at the bottom of FIG. 11A illustrates that all (or part of) antenna array 170g may be enclosed by a similar barrier 312.

Figure 11B:
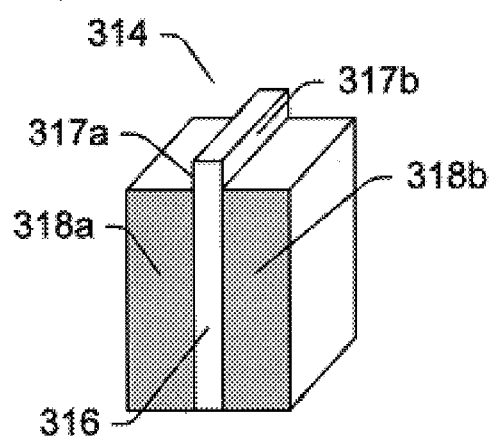

FIG. 11B depicts a cross section of an exemplary barrier 314 suitable for use as barriers 310 and/or 312. Barrier 314 includes both electromagnetic absorbing and reflecting materials. The electromagnetic reflecting material is provided by member 316, which includes at least one reflecting surface 317a and/or 317b. For example, reflecting surfaces 317a–b can be metallic surfaces. Indeed, member 316 may be comprised of metal. The electromagnetic absorbing material is represented by electromagnetic absorbing foam members 318a and 318b, which sandwich member 316 in this example. In certain implementations, barrier 314 may include just one of the foam members 318a–b.

The coupling between the receiver and transmitter is reduced with the use of barriers, such as, barriers 310, 312 and 314, because the capacitance between antenna elements is reduced, and essentially a "shroud" is placed so as to reduce the unwanted effects of the sidelobes. The transmission pattern is changed, however, such that the forward gain is reduced due to the lower aperture, and sidelobes are increased.

In general, with a barrier installed the zeros will no longer be at the same locations, because the transmission pattern has changed. Thus, compensation of the zero locations is required when the overall antenna array is illuminated. Compensation can be accomplished, for example, by computing the zero locations with the presence of the barriers (i.e., blockage), or by using a search system (e.g., having a Wiener spatial filter) to optimize the zero location for a reduction in interference. This second approach may, for example, utilize PLCP cross correlation detection techniques and the total power connected to the output of an FFT measuring spatial (angular) response.

Certain implementations involve the use of a PLCP/header/preamble cross-correlation process to determine the timing of arriving packets. The signals to be cross-correlated are output from an orthogonal spatial FFT calculation. After an estimate of timing has been obtained and initial spatial weighting coefficients have been (optionally) established, a Wiener filter, least mean squares and/or other like method may be used to further improve the SNR, e.g., by optimizing the weighting coefficients. Such process(es), for example, may be performed as a packet is being received and applied to a decoding process. Decoded data may be used to determine the desired signal, applied to a Wiener filter, least mean squares algorithm, or the like.

Applying Polarization Nulling, Delayed Cancellation and Quiet Time Techniques In accordance with certain further aspects of the present invention, the above polarization nulling, delayed cancellation and quiet time techniques can be advantageously combined to allow the use of adjacent and alternate channels within the same frequency band to improve the utilization of the associated frequency spectrum.

Figure 12:
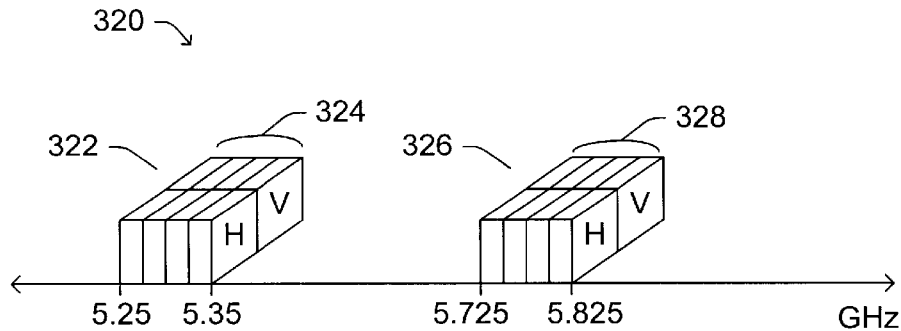
FIG. 12 is a graph depicting exemplary polarized channels within a two-band, multibeam and multi-frequency system, in accordance with certain implementations of the present invention.

To better understand this and other capabilities, attention is directed to the illustrative diagram in FIG. 12, which is a graph 320 depicting polarized channels within a two-band, multibeam and multi-frequency system. In this example, the first band 322 is a 5.3 GHz receive band that extends from 5.25 to 5.35 GHz, and the second band 326 is a 5.7 GHz transmit band that extends from 5.725 to 5.825 GHz. As illustrated, within the first band 322 there are a plurality of channels 324 that include both horizontal (H) and vertical (V) polarized channels. Similarly, within the second band 326 there are a plurality of channels 328 that include both H and V polarized channels.

Here, one of the goals is to implement the previous techniques so as to make full use of the available bandwidth for outgoing transmissions, while also supporting simultaneous reception of incoming transmissions to wireless routing device 102 when possible.

With this in mind, one technique is to have wireless routing device 102 initially transmit outgoing adaptive array signals using both H and/or V polarizations, with multiple beams per channel, within the 5.7 GHz band 326. At the same time, wireless routing device 102 would initially be able to receive incoming transmissions from other nodes using H and/or V polarizations, with multiple beams per channel, within the 5.3 GHz band 322. If the amount of outgoing traffic exceeds the available bandwidth of the 5.7 GHz band 326, then wireless routing device 102 could begin transmitting adaptive array signals using a portion of the available bandwidth in the 5.3 GHz band 322. Thus, for example, in certain implementations all or part of the horizontal (H) polarized channels within the 5.3 GHz band 322 will be used for transmitting adaptive array signals, while all or part of the vertical (V) polarized channels will still be configured to receive incoming transmissions from other nodes.

In certain implementations, the resulting horizontal transmit channels and vertical receive channels within the 5.3 GHz band 322 are preferably separated by at least one channel and some form of delayed cancellation techniques are employed to reduce unwanted coupling noise in the received signals.

In this manner, one or more of the delayed cancellation, polarization nulling and/or quiet time techniques can be applied to further optimize the communication traffic. The combination of these techniques tends to maximize the electromagnetic energy that is received by other nodes. However, the receiving nodes will, however, need to be capable of receiving all combinations of the polarization (i.e., H and V) within the applicable frequency band(s). The complexity of the various nodes will, therefore, be associated with the number of simultaneous transmit and receive signals that may be generated and received.

Exemplary Wireless Network Using A Plurality of Frequency Bands

Adaptive antennas can be expensive. However, in an IP routed network 100 having a plurality of wireless routing devices 102, the traffic capacity of network 100 will usually be increased by using adaptive antennas whenever feasible. The directionality of a given adaptive antenna within the wireless network need only be high enough to adapt to the direction of arrival (DOA) characteristics for those signals that the associated wireless routing device is concerned with. Even still, it is recognized that the use of an adaptive antenna may prove to be an overkill at times, especially when there are a number of scattering objects that further extend the associated coverage area. Conversely, the use of an omnidirectional antenna may in certain similar instances prove to be an underkill in that the resulting coverage area may be inadequate.

Figure 13:
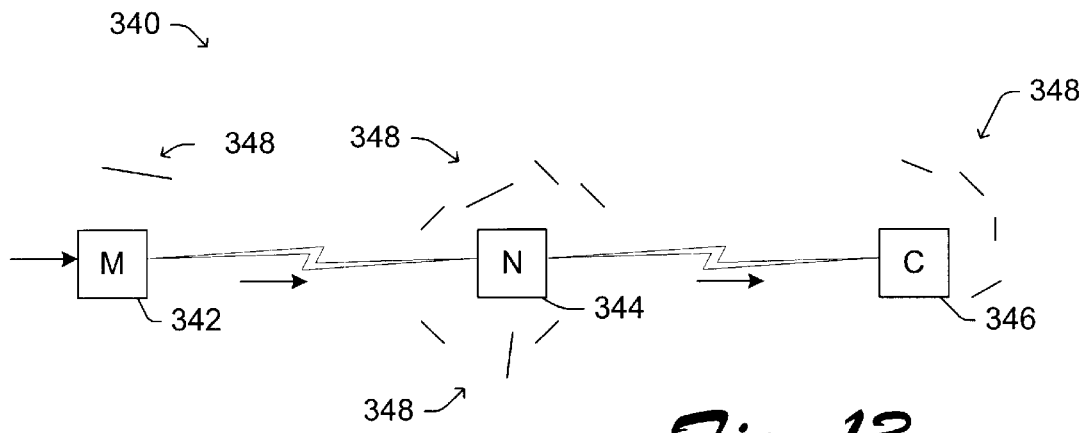
FIG. 13 is a block diagram depicting three nodes within a wireless routing network and a plurality of scattering objects, in accordance with certain exemplary implementations of the present invention.

FIG. 13 is block diagram depicting three nodes within an exemplary wireless routing network 340 and a plurality of scattering objects 348 that are nearby certain nodes. In this example, IP packets that arrive a node M 342 are routed to node N 344, which further routes the IP packets to Node C 346. With reference to network 100 in FIG. 1, for example, node M 342 could represent wireless routing device 102a (e.g., a metropolitan routing device), node N 344 could represent wireless routing device 102b (e.g., a neighborhood routing device), and node C could represent CPE device 106c.

An antenna array, such as, e.g., antenna array 110 in FIG. 2, which is optimized for node M 342 would not likely be optimized for use at node N 344 and/or node C 346. In a case where scattering increases as IP packets travel from node M 342 to node N 344 and then to node C 346, the number of elements in the antenna arrays may be decreased to better match the antenna array to the local environment's scattering objects 348. As an example, the antenna array at node M 342 may be capable of providing a 0.1 radian beam width using a 10λ aperture, the antenna array at node N 344 may provide a 0.5 radian beam width using a 2λ aperture, and the antenna at node C 346 may be an omnidirectional antenna. Preferably, the interference generated by each of the antenna arrays at nodes M and N should be minimized in those directions where the given antenna array is to generate a simultaneous second, third beam, etc.

Figure 14:
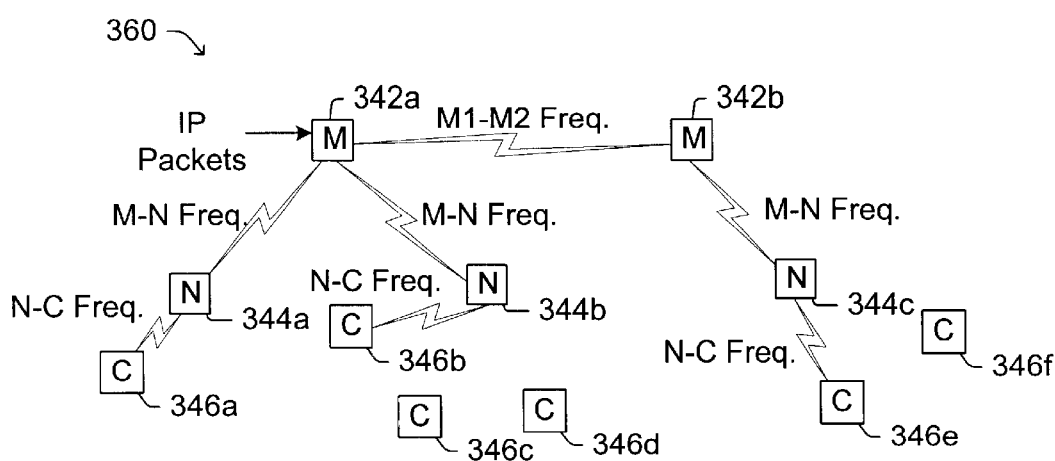
FIG. 14 is a block diagram depicting a hierarchical structure of various nodes within a wireless routing network, in accordance with certain exemplary implementations of the present invention.

With this in mind, FIG. 14 depicts a similar network 360 having two metropolitan (M) routing devices represented by node M 342a and node M 342b. As shown, node M 342a provide wireless connectivity to two neighborhood (N) routing devices represented by node N 344a and node N 344b. Node M 342b provides wireless connectivity to one neighborhood (N) routing device represented by node N 344c. Nodes 344a, 344b and 344c, are each further configured to provide wireless connectivity to certain client (C) devices selected from a set of client devices represented by nodes C 346a–f. More specially, node N 344a provides connectivity for node C 346a; node N 344b provides connectivity for nodes C 346b–d; and, node N 344c provides connectivity for nodes C 346e–f.

As shown in FIG. 14, the exemplary arrangement of nodes, e.g., in a somewhat hierarchical configuration, requires the use of three separate frequency bands to prevent interference between hierarchical levels during IP packet forwarding. Thus, there is a node M to node M (M-M) frequency band, a node M to node N (M-N) frequency band, and a node N to node C (N-C) frequency band. Several simultaneous transmit beams from node N 344b, for example, are possible. Thus, interference nulling may need to be implemented to reduce self-interference. Nevertheless, at least three separate frequency bands are preferred for the illustrated network to have sufficient transmit-receive isolation.

Ideally, the node N to node C paths will only represent short range links, which can be achieved using high microwave frequencies, such as, e.g., those within the 5.3 GHz band. Again, ideally the node M to node M paths are generally expected to be point-to-point microwave links, which may be achieved using frequencies within the 5.7 GHz band. The node M to node N links ideally should be achievable at a lower frequency, such as, for example, frequencies within a 2.5 GHz band. However, in certain exemplary implementations, the node N to node C frequencies may also be within a 2.4 GHz band.

Although not depicted in FIG. 14, other implementations of a wireless routing network may include node N to node N communications, for example, using yet another frequency band and/or a portion of one of the previously described bands. For example, an M-N frequency band may be established at 2.55 GHz and an N-N frequency band may be established at 2.67 GHz.

In accordance with certain implementations of the present invention, the various wireless communication links may be TDD and/or FDD based links. It is also noted, that the various frequencies that are described herein are examples only, and it is fully expected that other frequencies and/or frequency bands may be supported in other implementations.

As shown and described above, with proper antenna array separation and frequency band selection, wireless routing device 102 may simultaneously transmit and receive signals.

With respect to wireless routing device 102 and the examples provided above, the M-M and M-N links can further benefit from reciprocal and feedback methods that provide adaptive interference nulling. For example, the wireless routing devices associated with the M and N nodes can be configured such that the PHY and MAC use adaptive nulling wherein the feedback from node M or node N provides information that can be applied to reduce self-interference. Doing so will advantageously increase the data bit rate that can be supported over the corresponding communication links.

Figure 15:
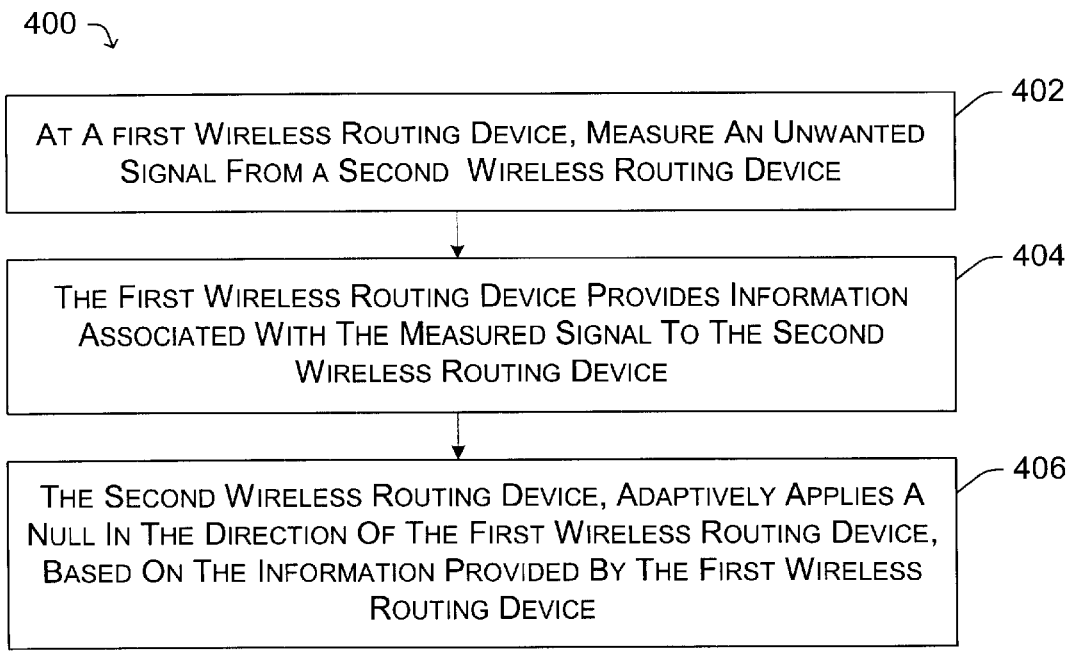
FIG. 15 is a flow diagram depicting an exemplary reciprocal and feedback process, in accordance with certain implementations of the present invention.

Reference is now made to the flow diagram in FIG. 15, which depicts an exemplary reciprocal and feedback process 400. Here, in step 402, a first wireless routing device, for example, at a node N, measures the level (e.g., a complex amplitude) of an unwanted signal transmitted from a second wireless routing device located at another node. The second wireless routing device may be located at a node M that may or may not normally provide connectivity to the node N having the first wireless routing device.

Next, in step 404, the first wireless routing device provides information about the measured unwanted signal to the second wireless routing device. The information may include, for example, the measured level, an identifier and perhaps a location of the first wireless routing device, etc. In certain implementations, the information may be transmitted over a wireless link between the first and second wireless routing devices. In other implementations, if the two wireless routing devices have another communication link available, e.g., a wired connection, then the information may be passed from the first to the second wireless routing device through this link. In either implementation, the information is provided to the second wireless routing device.

Subsequently, in step 406, based at least in part on the information that it received from the first wireless routing device, the second wireless routing device selectively applies a low null level in the direction of the first wireless routing device during subsequent transmissions to other nodes, if possible.

Spatial Processing

To provide the requisite adaptability and steering of the transmitted signal pattern, control logic 112 (FIG. 2) needs to be configured to selectively place peaks and nulls in certain directions for each beam. To accomplish this task, control logic 112 includes spatial processing logic that focuses on determining the appropriate placement of nulls within a desired far field pattern. There are several techniques available for calculating the proper angle (e.g., with respect to an orientation of the antenna array) at which the nulls are desired. One technique is to provide an all zero filter, another technique is to provide a weighting matrix. These techniques can be used together, wherein an all zero filter is used to build a weighting matrix. For example, the weighting inputs to a weighting matrix such as that shown in FIG. 3, which includes a bank of multipliers, can be determined such that the desired transmission pattern is created. These weighting values or polynomial coefficients can be generated ahead of time or on-the-fly using an all zero filter, for example. Calculated weighting values can be included, for example, in routing information 120.

In order to provide high data capacity, it is necessary to provide a far field pattern for each beam with nulls that may be placed at locations (or angles) where other beams will be placed. One way to produce the necessary antenna element weighting values is to calculate an inverse Fourier transform of the desired pattern. This produces the equivalent of an impulse response for each transmitted sample.

Figure 16A:
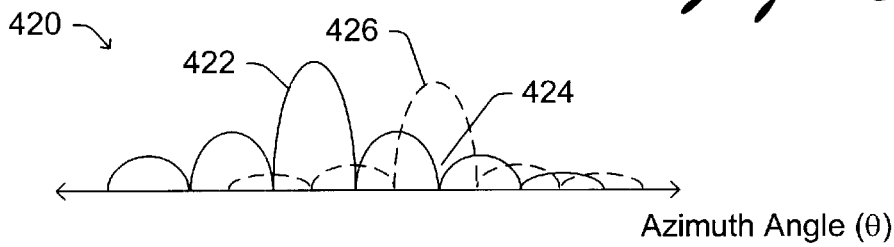
FIG. 16A is a graph depicting an approximation of a far field pattern having a desired peak at a first location and another beam having a peak at a nulled location of the far field pattern, in accordance with certain exemplary implementations of the present invention.

Graph 420 in FIG. 16A illustrates a far field pattern 422 having a desired peak at a first location (angle) and another beam represented by dashed line 426 having a peak that is located at a different angle than the peak of far field pattern 422. As illustrated, a null 424 in far field pattern 422 is placed at about the angle of the peak of the other beam. In this example, null 424 is required to allow high quadrature amplitude modulation (QAM) modulation, e.g., QAM-64, to be supported with a sufficient SNR, for example, about 25 dB.

Figure 16B:
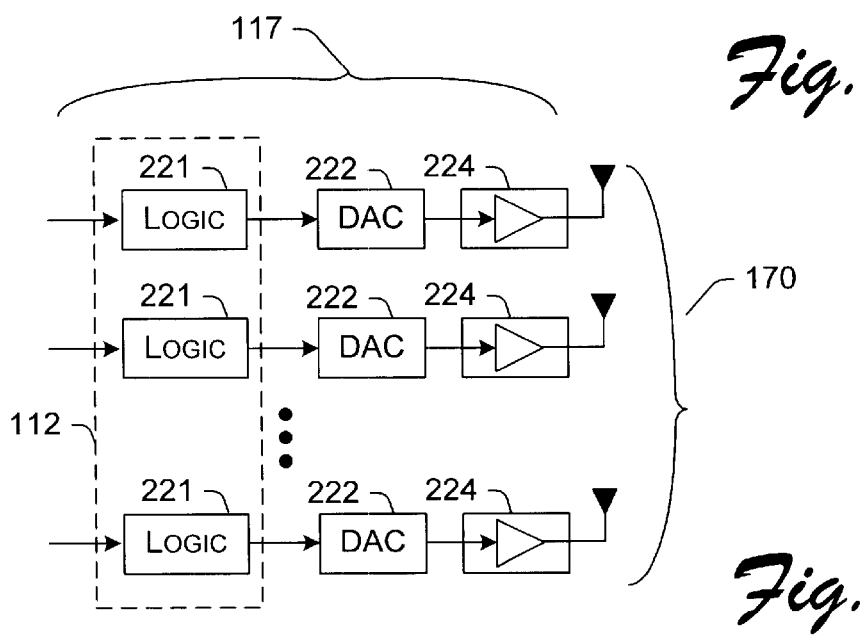
FIG. 16B is a block diagram depicting several transmission paths having spatial processing logic that is operatively coupled to a corresponding plurality of digital to analog converters, in accordance with certain exemplary implementations of the present invention.

With this in mind, FIG. 16B illustrates transmission path 117 having a plurality of spatial processing logic 221 operatively coupled to a corresponding plurality of DACs 222. Each DAC 222 applies its output to a corresponding up converter 224, which then provides an adaptive array signal to selected antenna elements.

Figure 16C:
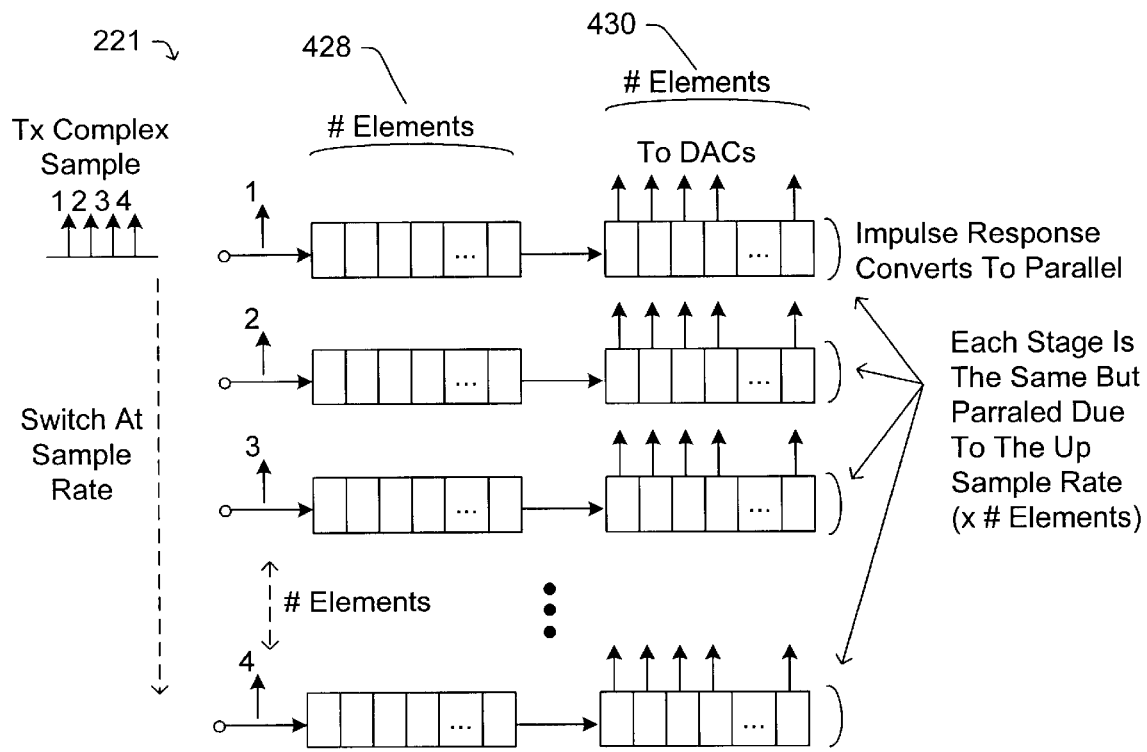
FIG. 16C is a block diagram depicting spatial processing logic that includes a finite impulse response (FIR) filter, in accordance with certain exemplary implementations of the present invention.
Figure 16D:
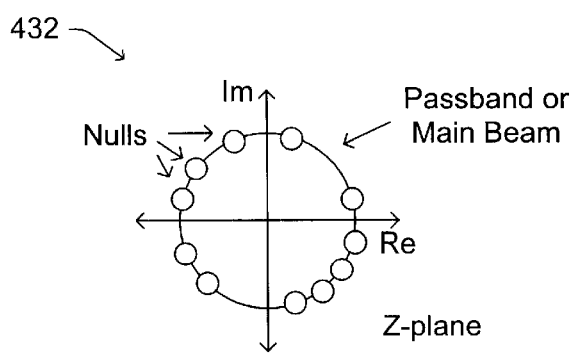
FIG. 16D is a graph illustratively depicting zeros/nulls selectively placed around a unit circle.

An exemplary implementation of spatial processing logic 221 is an all zero, or an approximate all zero, finite impulse response (FIR) filter. FIG. 16C depicts one such example. Here, spatial processing logic 221 includes two stages 428 and 430. The spatial processing may be calculated using a spatial filter driven by an impulse, followed by an impulse response capture register driving the DACs. Alternatively, such processing may be performed in parallel by a set of multipliers (not shown). The processing stage represented by block 428 may be part of an FIR filter that includes CORDIC stages to allow zeros to be placed around the unit circle 432, for example as illustrated in FIG. 16D. The second stage 430 receives the output from the first stage and applies the spatially filtered samples in parallel to the DACs.

Figure 16E:
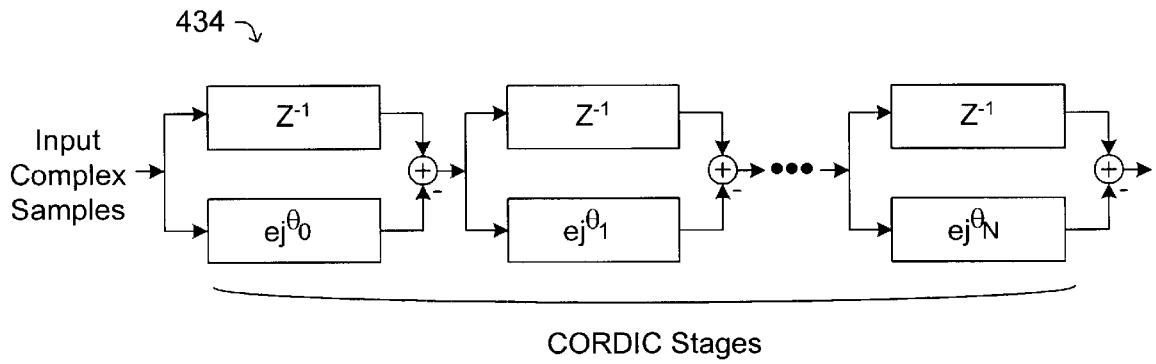
FIG. 16E is a block diagram depicting a cascaded set of CORDIC stages in an FIR filter, in accordance with certain exemplary implementations of the present invention.
Figure 16F:
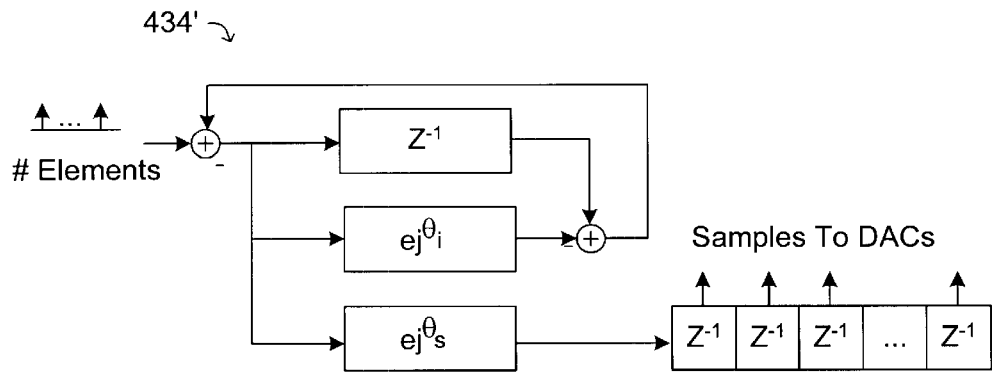
FIG. 16F is a block diagram depicting an iterative CORDIC stage in an FIR filter, in accordance with certain further exemplary implementations of the present invention.

FIG. 16E and FIG. 16F depict two exemplary ways in which CORDIC stages may be used. The CORDIC stages 434 are arranged in a cascaded arrangement in FIG. 16E, wherein the transfer function of the resulting FIR filter is:

$$H(z)=(z^{-1}-e^{j\Theta 0})(z^{-1}-e^{j\Theta 1}) \ldots (z^{-1}-e^{j\Theta N})$$

where, N is the number of elements. Thus, as depicted each stage may be implemented using delay elements (i.e., the upper blocks).

Rather than implementing a cascaded FIR filter, the CORDIC stages 434' in FIG. 16F are configured as part of an iterative system.

Here, the number of CORDIC stages required per element drops from the number(#) of elements per element down to two per element, in accordance with certain exemplary implementations, or $N_e^2$ to $2N_e$. For example, for 16 elements and 32 input channels, the number of CORDIC stages is 32*16*2=1024.

A similar configuration as in FIG. 16E and/or 16F can be provided for the corresponding receiver functionality, only it would operate in a reverse manner. For example, ADCs would be used instead of DACs. Reciprocity may then be relied on to allow the setting of the transmit zeros. An FFT may be used to determine the direction of signals received as a function of angle. An exemplary arrangement is depicted by logic 229 in FIG. 17A and FIG. 17B. In this manner, both reception and transmission zeros can be determined.

Figure 17B:
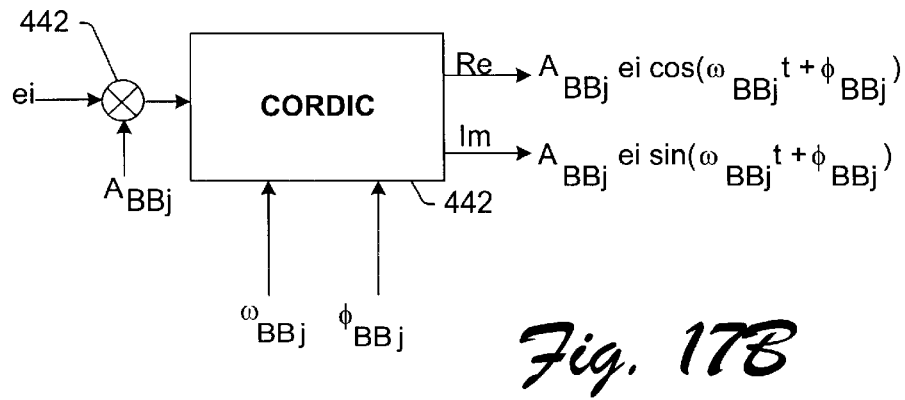
FIGS. 17A and 17B are block diagrams depicting spatial processing logic, in accordance with certain exemplary implementations of the present invention.
Figure 17A:
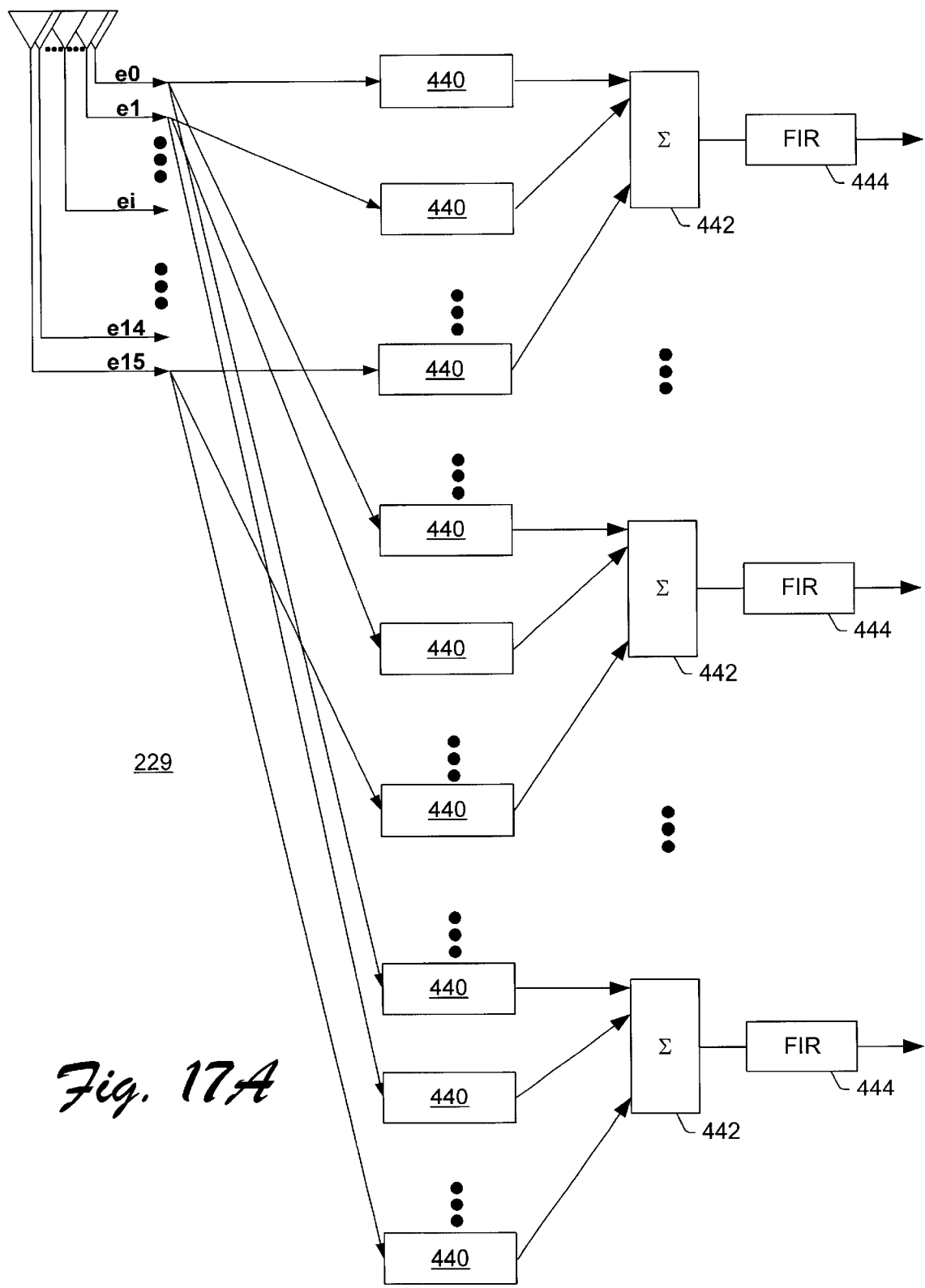

In FIG. 17A, a plurality of logic blocks 440 are shown as receiving selected inputs from the antenna array. Logic blocks 440 include, for example, CORDIC down converters, scalars and phase shifters (not shown). The inputs and outputs for logic blocks 440 are depicted in FIG. 17B. Logic blocks 440 provide complex multiplication and a frequency shift. The computation of the $A_{BBj}$ value and the $\phi_{BBj}$ value, which represent the polar value the complex weighting coefficient, for each one of the CORDIC stages can be determined by the polynomial produced from the expansion of all of the zeros. Here, the $\omega_{BBj}$ values represents the carrier frequency to be converted down from a pass band frequency.

With reference to FIG. 17A, the outputs from logic blocks 440 are provided to summers 442. The output of summers 442 are provided to FIR filters 444.

In accordance with certain further implementations, the processing accomplished in the various logic stages above, may also be performed on a split basis, wherein zeros that are common between channels are placed in a common filter path. Zeros corresponding to each channel can be separately cascaded to allow a particular response from each channel's required response of angular beam width.

Those skilled in the art will recognize that an arrangement of similar logic blocks and similar components can be combined to form a transmitter that functions according to what is basically a reversed process of the exemplary receiving process as shown in FIG. 17A.

Scheduling and Allocating Resources

Logic 112 includes a scheduling capability that makes decisions regarding the allocation of resources, for example, based on a demand matrix that identifies both downlink traffic demands and known uplink traffic demands, and/or transmission constraints identified by the search receiver. The allocation of resources may include, for example, allocating the CORDIC or like resources that provide the requisite mathematical computations for the signals that are to be transmitted or signals to be received.

In accordance with certain implementations of the present invention, the scheduling capability utilizes queues to determine the allocation of resources. Some of the queues may, for example, be associated with certain levels of quality of service (QoS) that are assigned to different data packets.

Figure 18:
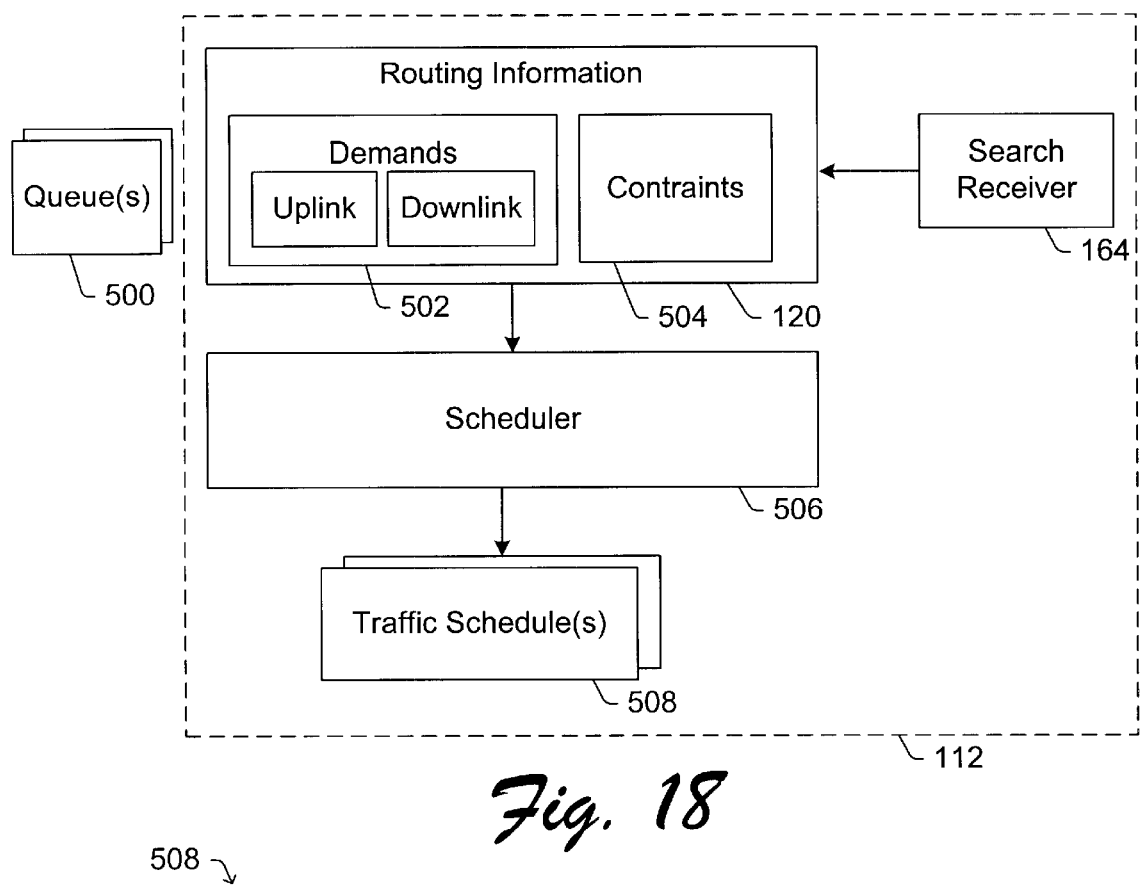
FIG. 18 is a block diagram depicting scheduling logic, in accordance with certain exemplary implementations of the present invention.

A functional block diagram for an exemplary scheduling capability provided by logic 112 is depicted in FIG. 18. Data packets that are to be sent from a wireless routing device (i.e., down linked) to another node are associated with a queue 500, for example, by identifying the data packets in a queue of pointers, placing the data packets in a queue, or other like manner. Similarly, data packets or data traffic that is expected to be received by the wireless routing device from another node are also associated with a queue 500.

The resulting queues 500 and/or the information therein may also be logically arranged or otherwise configured based on a QoS associated with the data packets or a data stream, for example. It is further expected that queues 500 will be arranged based on other priority schemes, such as, a first come first serve scheme, etc. The queues 500 may also take into consideration a "lifetime" or other time critical information associated with the data packets. Hence, for example, data packets that are about to have their measured lifetime expire, may be moved up in a queue.

Queues 500 are active whenever data packets are waiting to be uplinked or downlinked with regard to the wireless routing device. Based on queues 500, certain demands 502 are identified, for example within routing information 120. In certain implementations, for example, demands 502 are maintained in a demand matrix. In the example shown in FIG. 18, the demands 502 include uplink and downlink demands, since these demands will drive the scheduling of transmissions and receptions.

Routing information 120 further includes constraints 504, such as, for example, the transmission constraints identified by search engine 164. In certain implementations, the constraints 504 are, for example, maintained in a constraints matrix. The constraints 504 may include information relating to certain rules for transmissions and receptions, information about discovered and/or historical transmission/ reception performance, etc. For example, in certain exemplary implementations constraints 504 includes information about known/unknown interferences that may be pertinent to the scheduling of transmissions/receptions.

The above and other types of useful information within routing information 120 are provided to a scheduler 506. Using such information, scheduler 506 is tasked with generating traffic schedules 508 for transmissions and receptions based, for example, on an angular (or dimensional) parameters and time (or frequency) parameters.

Figure 19:
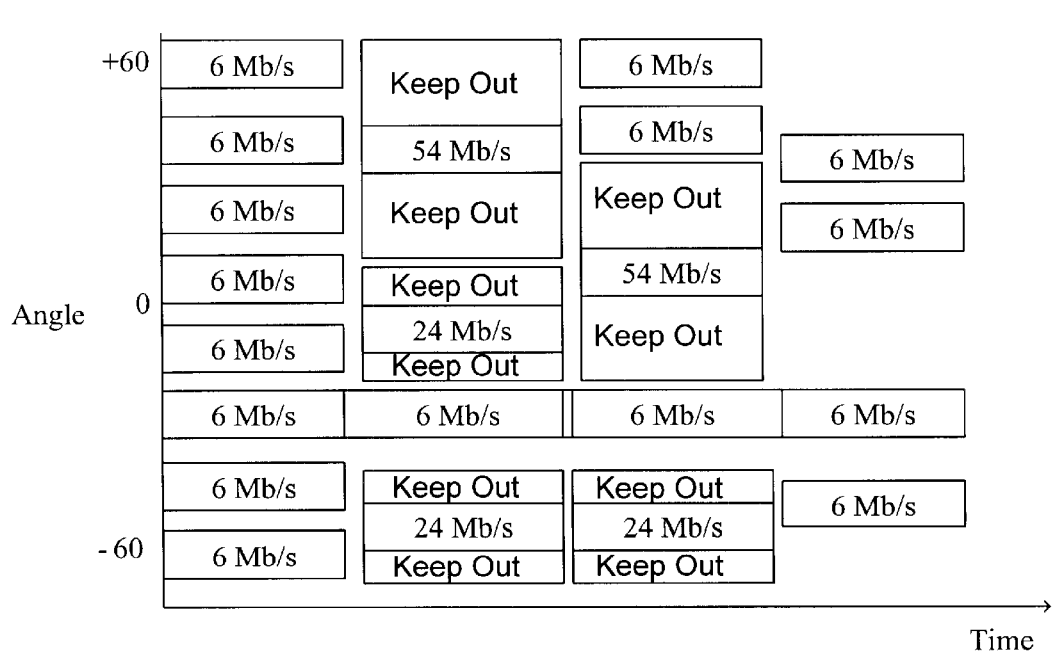
FIG. 19 is a graph illustratively depicting a traffic schedule associated with scheduling logic, for example, as in FIG. 18, in accordance with certain exemplary implementations of the present invention.

An exemplary graphical representation of a transmission (downlink) traffic schedule 508 is depicted in FIG. 19. Here, angles associated with the antenna array are identified on the y-axis as extending from −60° to +60°, in this example. The x-axis represents time. A plurality of transmissions are scheduled and identified by blocks in the graph, which also identify the associated data transmission rates. Further, in this example, certain "keep out" areas are also depicted by blocks and marked as such. No significant transmissions should occur within the keep out areas.

Figure 20:
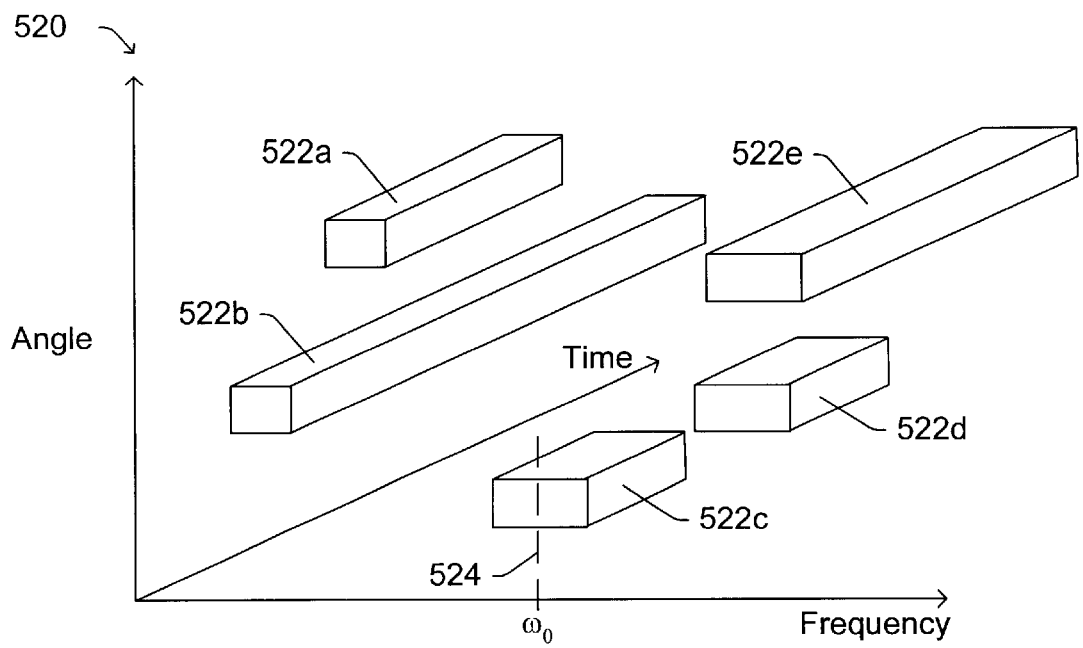
FIG. 20 is a graph depicting scheduled transmissions, with respect to angle, frequency and time, in accordance with certain exemplary implementations of the present invention.

By way of further example, graph 520 in FIG. 20 illustrates five different transmissions 522*a–e* scheduled within a given period of time, each transmission has associated with it a frequency band and an angle. Here, for example, transmission 522*c* has a center frequency of $\omega_0$ as marked by dashed line 524. A similar graph may also be used to illustrate scheduled receptions.

Figure 21:
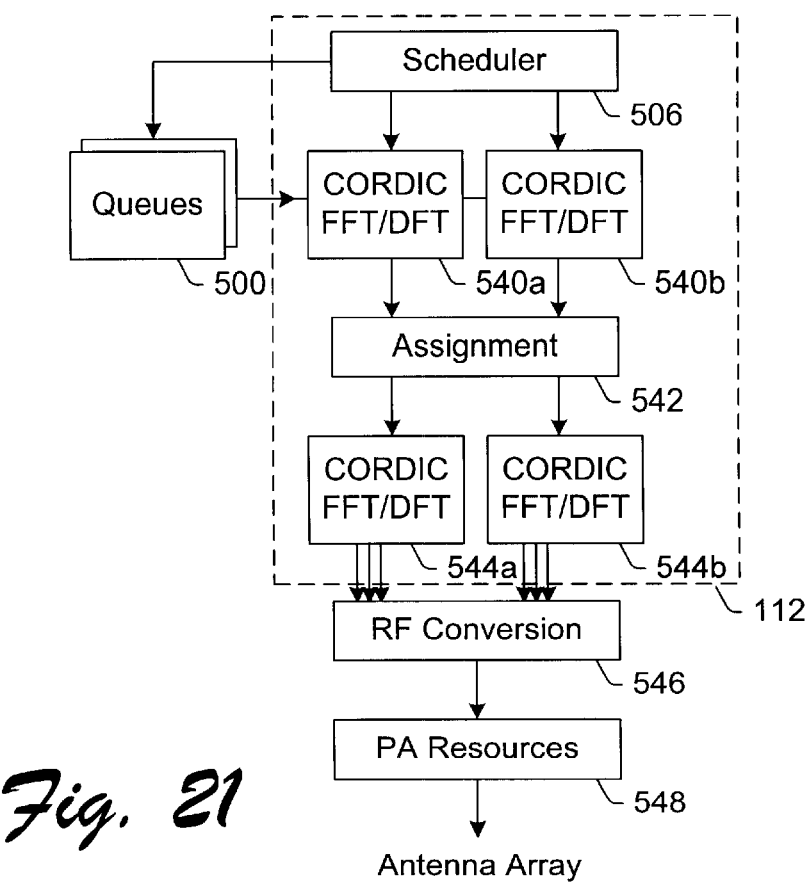
FIG. 21 is a functional block diagram depicting an exemplary process flow for use in scheduling and transmitting data packets, in accordance with certain exemplary implementations of the present invention.

FIG. 21 depicts a block diagram illustrative of an exemplary flow for the scheduling and transmission of data packets, in accordance with certain further exemplary implementations of the present invention. Here, scheduler 506 is operatively configured to take into consideration QoS and other parameters, for example, relating to the number of subscribers and/or the data packets in queue 500, peak data rates, sustained data rates, latency, isochronous performance, etc. Based on such parameters, scheduler 506 applies CORDIC FFT/DFT resources 540*a–b* and subsequently 544*a–b* to the combined angular, frequency and time arrangement of electromagnetic signals. CORDIC FFT/DFT resources 540*a–b* assist with creating an assignment 542, which may be included in traffic schedule 508. When the appropriate time arrives for the transmission to begin, then CORDIC FFT/DFT resources 544*a–b* are used to prepare the data for an RF conversion process 546. Following RF conversion process 546, the resulting adaptive array signals are then provided to the applicable adaptive array resources 548 and transmitted using all or part of an antenna array.

On the receive side, a similar allocating process can be conducted based on seeking the presence of signals arriving from various directions. Beams may be shaped for various multipath and interference amelioration requirements. For receptions, scheduler 506 may use information from the MAC about the expected signals that are to arrive at the wireless routing device. In certain cases, the MAC may have already assigned reverse resources for use with the reception.

Figure 22:
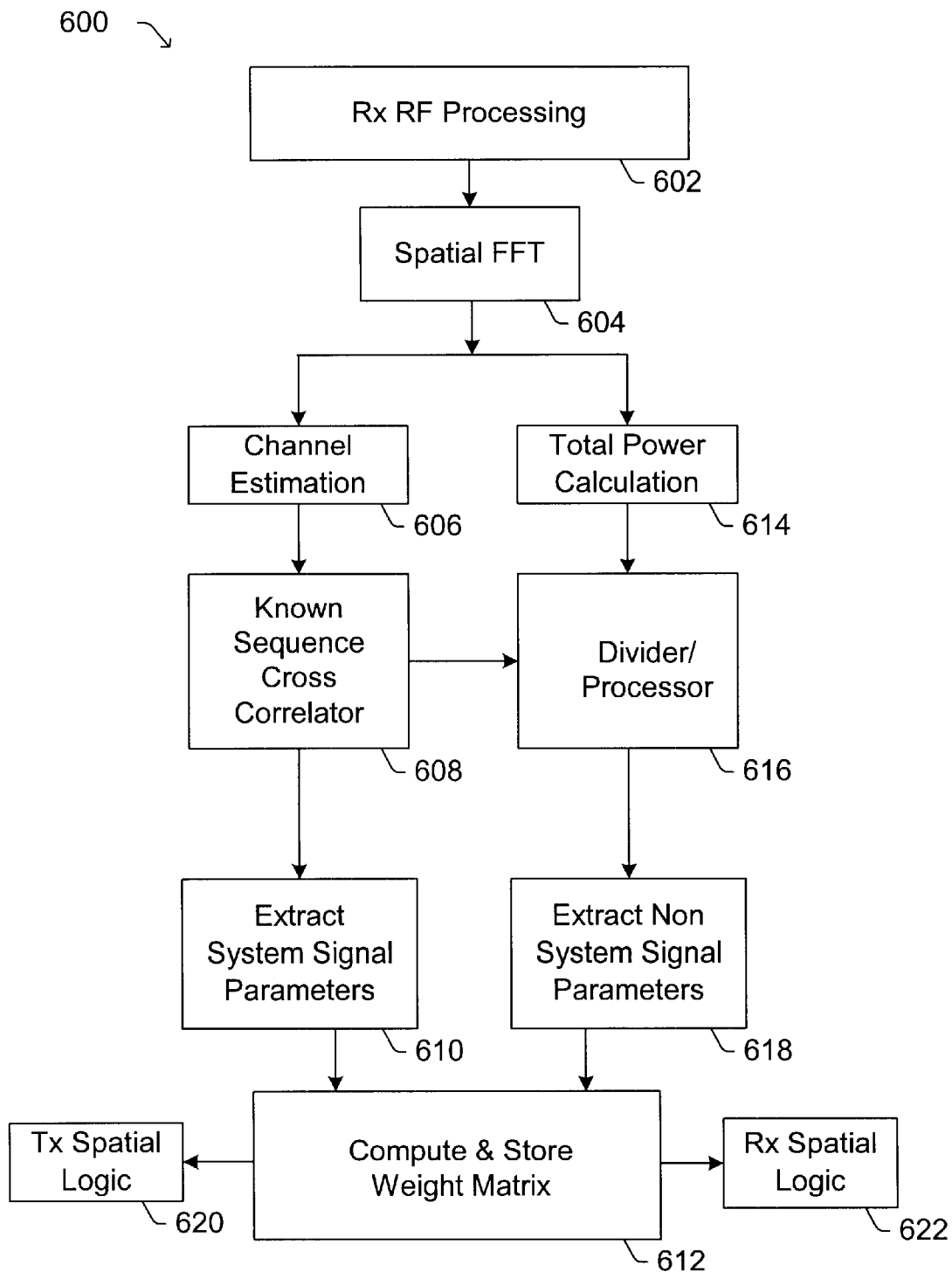
FIG. 22 is a functional flow diagram depicting various processing associated with an exemplary search receiver process, in accordance with certain exemplary implementations of the present invention.

FIG. 22 is a functional flow diagram depicting processing associated with an exemplary search receiver process 600. Here, in step 602, a receiver processes the RF signal received with an antenna array. The resulting element domain values are provided to step 604, wherein a spatial FFT process converts them into corresponding pattern domain values. The pattern domain values are then provided to step 606, wherein a FFT process or other process, such as, e.g., a pilot cross-correlation process, is employed to estimate the channel. The resulting estimated channel data is then provided to step 608, wherein a known sequence cross correlation process, such as, e.g., a PLCP header preamble or other like information cross-correlation process, is conducted. The resultant data from the cross-correlation process is then provided to step 610 in which system signal parameters are extracted. These parameters may then be included or otherwise incorporated in constraints 504 (FIG. 18). The data is then provided to step 612, wherein the weighting values are computed and stored, for example, in a weighting matrix.

Returning to step 604, the resulting pattern domain data are also provided to step 614 for a total power calculation, the results of which may be included in or otherwise incorporated in constraints 504. Next, a Wiener filter division or like process is performed in step 616, with inputs from steps 614 and 608. The resultant data is then provided to step 618, wherein any non system parameters relative to constraints 504 are extracted and supplied thereto. The data is then provided to and utilized in step 612 with regard to the weighting values. In this manner, the search receiver essentially acts as an adaptive filter to optimize/update the weighting values so as to detect the signal indicated by knowledge of the PLCP header or other like information that is cross-correlated.

The stored weighting values are then provided, as applicable, to a transmission spatial logic process in step 620 and/or to a receive spatial logic process in step 622.

Exemplary OFDM Receiver/Transmitter Functionality

Figure 23:
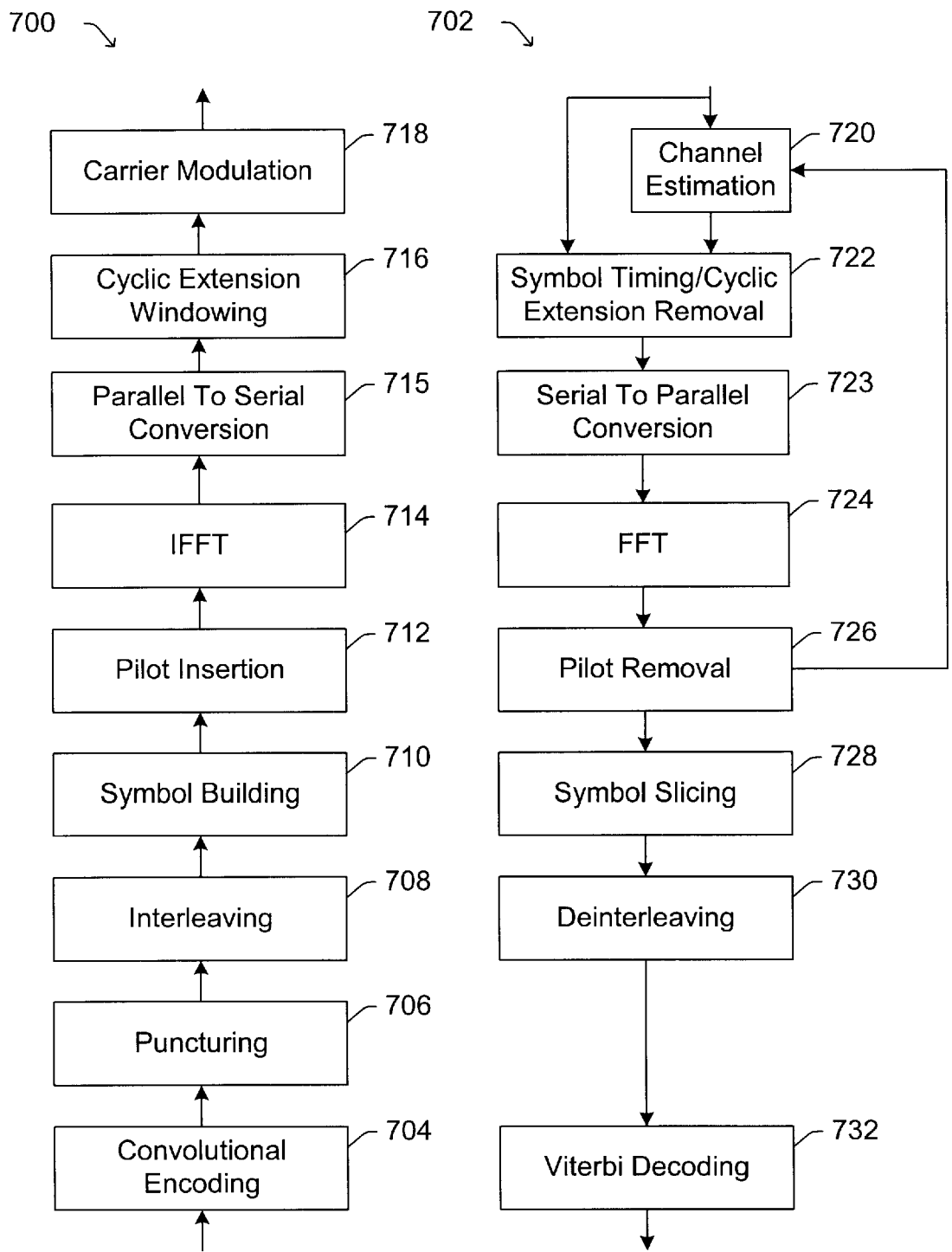
FIG. 23 is a functional flow diagram depicting various exemplary functions performed within an OFDM receiver path and an OFDM transmitter path, in accordance with certain implementations of the present invention.

FIG. 23 is a functional flow diagram depicting various exemplary functions performed within an OFDM transmitter path 700 and an OFDM receiver path 702, in accordance with certain implementations of the present invention. Those skilled in the art will recognize that other types of receivers/ transmitters may be used, such as, e.g., QPSK receivers and transmitters.

Transmitter path 700 begins with a convolutional encoding process 704, which receives data to be transmitted and generates corresponding encoded data based on known convolutional techniques. This encoded data is then "punctured" using a puncturing process 706 to produce corresponding punctured data. The puncturing process is configured to modify the encoding rate. Next, the resulting punctured data is interleaved in an interleaving process 708, which produces corresponding interleaved data. Interleaving process 708 is conducted so as to spread data over a symbol to improve burst error performance.

A symbol building process 710 is then accomplished with the interleaved data to produce corresponding symbolic, constellation mapped, data that is then provided to a pilot insertion process 712. The resulting data is then provided to an inverse fast Fourier transform (IFFT) process 714 and processed accordingly. Next, the resulting IFFT data is provided to a parallel to a serial conversion process 715, which prepares the IFFT data for transmission. The resulting serial IFFT data is then provided to a cyclic extension windowing process 716, which is configured to insert a guard interval to improve multipath performance.

The resulting cyclic extended data is then provided to a carrier modulation process 718 to configure the signal for transmission. Carrier modulation process 718 is configured to upconvert the baseband signal for application to the spatial weighting system.

Turning now to receiver path 702, data that is received is provided to a channel estimation process 720, wherein the received data and pilot information is used to equalize the channel response. The received data is also provided to a symbol timing/cyclic extension removal process 722, along with data from the channel estimation process 720. Symbol timing/cyclic extension removal process 722 is configured to provide a windowed set of data to optimize the FFT performance. Next, the resulting data from symbol timing/cyclic extension removal process 722 is provided to a serial to parallel conversion process 723, which is configured to produce corresponding sequences of received samples.

The sequences of received samples are provided to a fast Fourier transform (FFT) process 724 and processed accordingly therein. The resulting data from FFT process 724 is applied to a pilot removal process 726 to provide an estimation of the channel to improve multipath performance.

Next, the resulting pilotless data is provided to a symbol slicing process 728 that is configured to convert symbolic constellation mapped signals to underlying data. The resulting symbol sliced data is then provided to a deinterleaving process 730, and processed accordingly. The resulting symbol sliced data may also be fed back to the channel estimation process 720, and used in equalizing the channel response. Then, the deinterleaved data is provided to a Viterbi decoding process 732, wherein the data is decoded to produce corresponding decoded received data.

Dual Bands Dual Protocol OFDM/OFDMA Techniques

One current system that is being implemented for IEEE 802.16 is a combined 2.6 GHz OFDM/OFDMA system. OFDMA stands for Orthogonal Frequency Division Multiple Access. The current systems that are being implemented for 5.7 GHz are IEEE 802.11a (which is an OFDM system) and IEEE 802.11b *(which is an OFDM/OFDMA system). OFDM includes* 64 tones, for example, that can be used to transmit data. OFDMA provides more tones, many of which are not currently allocated. The receiver in certain exemplary CPE devices is an OFDM receiver that includes a 64-point FFT. However, software may be included in the CPE device that allows the 64-point FFT to be converted into an OFDMA receiver. This allows for a dual mode configuration.

Moreover, in certain situations, a dual mode configuration may be combined with a plurality of frequency bands. For example, in accordance with certain aspects of the present invention, a dual band, dual protocol OFDM/OFDMA system may be implemented.

Figure 24:
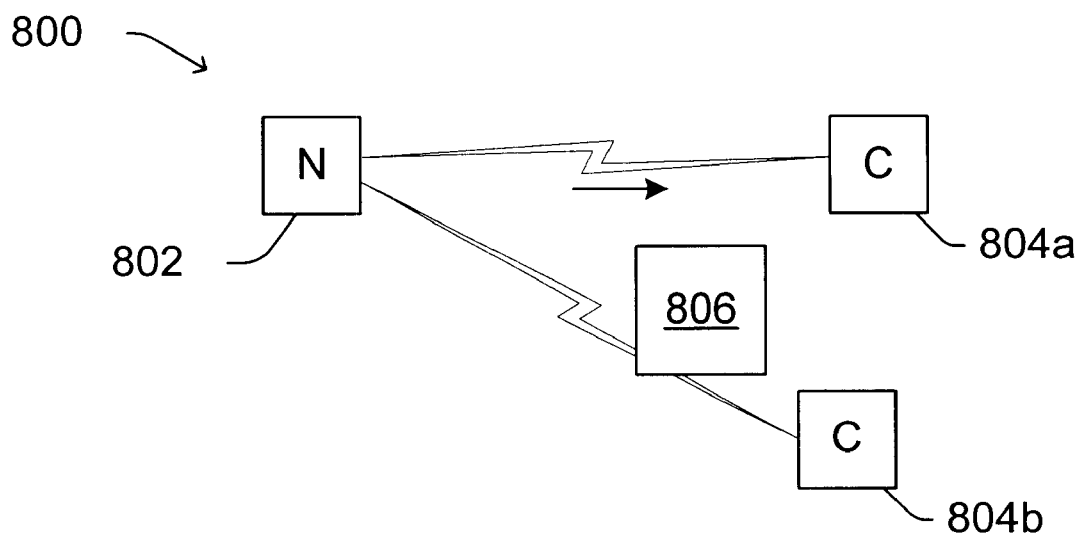
FIG. 24 is block diagram illustratively depicting a wireless routing network wherein dual band, dual protocol OFDM/OFDMA techniques may be implemented to overcome the presence of obstacles between a wireless routing device and a CPE device, in accordance with certain implementations of the present invention.

By way of example, in certain locations there may be a problem with shadow fading that prohibits the use of high data rates on a reverse link. For example, the arrangement 800 depicted in FIG. 24 illustrates that a first CPE device 804a has a "clear" line of sight to a wireless routing device 802, but a second CPE device 804b does not have a "clear" line of sight to wireless routing device 804 as a result of an obstacle 806 blocking the RF path. Here, for example, the CPE devices 804a–b can be configured to communicate with wireless routing device 802 on selected frequency bands using an OFDM PHY configured at full rate. Alternatively, CPE devices 804a–b may be configured with OFDMA being implemented in software, for example, so as to allow for a reduced bandwidth. CPE device 804a may operate at a first frequency band and CPE device 804b may operate at a second frequency band.

One problem with arrangement 800 is that shadow fading due to obstacle 806 may prevent operation of a reverse link at high rates for CPE device 804b. For example, shadow fading at 5.7 GHz may prevent operation of a reverse link at high rates. Therefore, as introduced earlier, a 2.6 GHz band may prove more desirable in this case for the reverse link. In most cases, however, it is assumed that CPE device 804b will likely only be able to support a single frequency band. The receiver of wireless routing device 802, in such cases, will need to be dual band (e.g., 5.7 GHz and 2.6 GHz).

The bit rate of transmissions to CPE device 804b can be reduced by using payload resident known sequences, because the Viterbi decoder 732 (FIG. 23) in wireless routing device 802 may be selectively bypassed.

In general, a smaller FFT at the CPE device is preferred, due to the complexity of implementation. A software driver payload coded scheme to reduce the bit rate may be implemented in the CPE device to allow greater range coverage at a bit rate lower than the minimum available from the FFT in the CPE device (e.g., operating in BPSK OFDM mode). The lower bit rate can be achieved by encoding the payload with spread spectrum signals, and/or by creating OFDMA by transmitting a long slowly rotating (or non-rotating) vector in each OFDM tone. Receiver resources may be allocated to maximize the capacity in each band. The capacity can be maximized for the available receiver hardware due to the use of receivers on either band. Thus, payload resident OFDMA provides a lower effective bandwidth for uplink transmissions, or downlink transmissions by lowering the effective bandwidth of the receiver to below the bandwidth of a bin of the OFDM receiver (here, the bin is of the CPE device OFDM transmitter).

SUMMARY

Exemplary methods, apparatuses and systems have been described and shown herein for use in a wireless routing network environment. One apparatus, for example, includes an adaptive antenna that is configurable to receive a signal and in response transmit corresponding outgoing multi-beam electromagnetic signals exhibiting a plurality of selectively placed transmission peaks and transmission nulls within a far field region of a coverage area. The adaptive antenna may also be configured to selectively receive at least one incoming electromagnetic signal directed through the coverage area. As described herein, the adaptive antenna may include one or more antenna arrays and associated logic. Each antenna array may include plurality of antenna elements. The logic, which is operatively coupled to the antenna array, is configured to selectively control the placement of the transmission peaks and transmission nulls within the outgoing multi-beam electromagnetic signals produced by the antenna array(s). The logic may also be configured to selectively control the reception of at least one incoming electromagnetic signal. As further described above, the logic can be configured to be responsive to a variety of routing information. In certain implementations, at least a part of the routing information may be dynamically maintained, for example, in one or more routing tables or like data structures.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An apparatus for use in a wireless routing network, the apparatus comprising:
    an adaptive antennas;
    at least one transmitter operatively coupled to said adaptive antenna;
    at least one receiver operatively coupled to said adaptive antenna;
    control logic operatively coupled to said transmitter and configured to cause said at least one transmitter to output at least one transmission signal to said adaptive antenna to transmit corresponding outgoing multi-beam electromagnetic signals exhibiting a plurality of selectively placed transmission peaks and transmission nulls within a far field region of a coverage area based on routing information; and
    search receiver logic operatively coupled to said control logic and said at least one receiver and configured to update said routing information based at least in part on cross-correlated signal information that is received by said receiver using said adaptive antenna.

2. The apparatus as recited in claim 1, wherein said cross-correlated signal information is based on at least one cross-correlatable data sequence selected from a group of data sequences comprising a data sequence from at least one received synchronization packet, a data sequence from at least one header portion of a received packet, and a data sequence from at least one PLCP header portion of a received packet.

3. The apparatus as recited in claim 1, wherein said adaptive antenna includes at least one antenna array comprising a plurality of antenna elements.

4. The apparatus as recited in claim 3, wherein said control logic is responsive to said routing information in selectively controlling said placement of transmission peaks and transmission nulls within said outgoing multi-beam electromagnetic signals, and selectively controlling said reception of at least one incoming electromagnetic signal.

5. The apparatus as recited in claim 4, wherein at least a portion of said routing information is dynamically determined and maintained by said search receiver logic.

6. The apparatus as recited in claim 5, wherein said routing information includes at least one form of routing information selected from a group of routing information comprising transmit power level information, transmit data rate information, antenna pointing direction information, weighting information, constraints information, transmission null location information, transmission peak location information, Quality of Service (QoS) information, priority information, data packet lifetime information, frequency information, timing information, and keep out area information.

7. The apparatus as recited in claim 4, wherein at least a portion of said routing information is stored in at least one routing table.

8. The apparatus as recited in claim 7, wherein said routing table includes at least one form of routing information selected from a group of routing information comprising IP address information, MAC address information, protocol identifying information, modulation method identifying information, Connection ID (CID) information, node directional information, node transmit power level information, node received signal strength indicator (RSSI) level information, transmit channel information, backup transmit channel information, receive channel information, backup receive channel information, transmission data rate information, receive data rate information, and interference nulling information.

9. The apparatus as recited in claim 4, wherein said control logic maintains weighting values within said routing information, said weighting values being associated with a selected weighting pattern that is applied to selectively control said placement of transmission peaks and transmission nulls within said outgoing multi-beam electromagnetic signals, and further configured to selectively control said reception of said at least one incoming electromagnetic signal.

10. The apparatus as recited in claim 9, wherein said weighting values w(z) are associated with a polynomial expansion $w(z)=w_0+w_1z+w_2z^2+w_3z^3+w_4z^4+ \ldots +w_iz^i$.

11. The apparatus as recited in claim 10, wherein said weighting values define at least one zero of said polynomial expansion, said at least one zero being associated with a direction that a transmission null is selectively placed.

12. The apparatus as recited in claim 4, wherein said search receiver logic is configured to determine at least one transmission constraint based at least in part on said received signal, said transmission constraint being included in said routing information.

13. The apparatus as recited in claim 4, wherein said control logic further includes a scheduler configured to establish at least one traffic schedule based at least in part on said routing information.

14. The apparatus as recited in claim 13, wherein said routing information further includes transmission demand information.

15. The apparatus as recited in claim 13, wherein said scheduler is further configured to establish said at least one traffic schedule by determining at least one assignment for an outgoing data transmission.

16. The apparatus as recited in claim 15, wherein the scheduler includes COordinate Rotation DIgital Computer (CORDIC)-based transforming resources that are configurable to be applied to a combined angular, frequency and time arrangement of outgoing electromagnetic signals in establishing said assignment.

17. The apparatus as recited in claim 15, wherein said routing information includes at least one form of routing information selected from a group comprising Quality of Service (QoS) information, subscriber information, queue information, peak data rate information, sustained data rate information, latency information, and isochronous performance information.

18. The apparatus as recited in claim 7, wherein said control logic further includes a scheduler and said routing table further includes at least one primitive routine that is configured to support said scheduler.

19. The apparatus as recited in claim 4, wherein said control logic is configured to allow said transmitter and said receiver to operate simultaneously.

20. An apparatus for use in a wireless routing network, the apparatus comprising:
    at least one receiver configured to receive at least one incoming electromagnetic signal and output at least one corresponding received signal;
    at least one transmitter configured to receive a data signal and in response output a corresponding transmission signal; and
    at least one adaptive antenna operatively coupled to said at least one transmitter and at least one receiver and configured to receive said transmission signal and in response transmit corresponding outgoing multi-beam electromagnetic signals exhibiting a plurality of selectively placed transmission peaks and transmission nulls within a far field region of a coverage area, and to selectively receive at least one incoming electromagnetic signal directed through said coverage area, and wherein said at least one adaptive antenna is further configured to cross-correlate data sequences in said at least one received signal and based thereon selectively adjust said outgoing multi-beam electromagnetic signals.

21. The apparatus as recited in claim 20, wherein said cross-correlated data sequence is selected from a group of cross-correlatable data sequences comprising a data sequence from at least one received synchronization packet, a data sequence from at least one header portion of a received packet, and a data sequence from at least one PLCP header portion of a received packet.

22. The apparatus as recited in claim 20, wherein said adaptive antenna includes:
at least one antenna array comprising a plurality of antenna elements; and
logic operatively coupled to said antenna array, said at least one transmitter and said at least one receiver, and configured to selectively control said placement of transmission peaks and transmission nulls within said outgoing multi-beam electromagnetic signals, and further configured to selectively control said reception of said at least one incoming electromagnetic signal.

23. The apparatus as recited in claim 22, wherein said logic is responsive to routing information in selectively controlling said placement of transmission peaks and transmission nulls within said outgoing multi-beam electromagnetic signals, and selectively controlling said reception of said at least one incoming electromagnetic signal.

24. The apparatus as recited in claim 23, wherein at least a portion of said routing information is dynamically determined and maintained by said logic.

25. The apparatus as recited in claim 24, wherein said routing information includes at least one form of routing information selected from a group of routing information comprising transmit power level information, transmit data rate information, antenna pointing direction information, weighting information, constraints information, transmission null location information, transmission peak location information, Quality of Service (QoS) information, priority information, data packet lifetime information, frequency information, timing information, and keep out area information.

26. The apparatus as recited in claim 23, wherein at least a portion of said routing information is stored in a routing table by said logic.

27. The apparatus as recited in claim 26, wherein said routing table includes at least one form of routing information selected from a group of routing information comprising IP address information, MAC address information, protocol identifying information, modulation method identifying information, Connection ID (CID) information, node directional information, node transmit power level information, node received signal strength indicator (RSSI) level information, transmit channel information, backup transmit channel information, receive channel information, backup receive channel information, transmission data rate information, receive data rate information, and interference nulling information.

28. The apparatus as recited in claim 23, wherein said logic maintains weighting values within said routing information, said weighting values being associated with a selected weighting pattern that is applied to selectively control said placement of transmission peaks and transmission nulls within said outgoing multi-beam electromagnetic signals, and further configured to selectively control said reception of said at least one incoming electromagnetic signal.

29. The apparatus as recited in claim 28, wherein said weighting values w(z) are associated with a polynomial expansion $w(z)=w_0+w_1z+w_2z^2+w_3z^3+w_4z^4+\ldots+w_iz^i$.

30. The apparatus as recited in claim 29, wherein said weighting values define at least one zero of said polynomial expansion, said at least one zero being associated with a direction that a transmission null is selectively placed.

31. The apparatus as recited in claim 23, wherein said transmitter and said adaptive antenna are operatively configured to produce said outgoing multi-beam electromagnetic signals based on a determined spatial environment parameters associated with said coverage area and as maintained in said routing information.

32. The apparatus as recited in claim 23, wherein said logic further includes a search receiver configured to determine at least one transmission constraint based at least in part on said received signal, said transmission constraint being included in said routing information.

33. The apparatus as recited in claim 23, wherein said logic further includes a scheduler configured to establish at least one traffic schedule based at least in part on said routing information.

34. The apparatus as recited in claim 33, wherein said routing information further includes transmission demand information.

35. The apparatus as recited in claim 34, wherein said transmission demand information includes at least one form of transmission demand information selected from a set comprising incoming transmission demand information and outgoing transmission demand information.

36. The apparatus as recited in claim 35, wherein said incoming transmission demand information is associated with at least one transmission queue maintained by an externally located device and said outgoing transmission demand information is associated with at least one transmission queue internal to said apparatus.

37. The apparatus as recited in claim 36, wherein said at least one transmission queue is associated with a Quality of Service (QoS) parameter.

38. The apparatus as recited in claim 23, wherein said scheduler is further configured to establish said at least one traffic schedule by determining at least one assignment for an outgoing data transmission.

39. The apparatus as recited in claim 38, wherein said logic further includes COordinate Rotation DIgital Computer (CORDJC)-based transforming resources that are configurable to be applied to a combined angular, frequency and time arrangement of outgoing electromagnetic signals in establishing said assignment.

40. The apparatus as recited in claim 38, wherein the scheduler is further configured to control the CORDIC-based transforming resources.

41. The apparatus as recited in claim 38, wherein said routing information includes at least one form of routing information selected from a group comprising Quality of Service (QoS) information, subscriber information, queue information, peak data rate information, sustained data rate information, latency information, and isochronous performance information.

42. The apparatus as recited in claim 26, wherein said logic further includes a scheduler and said routing table further includes at least one primitive routine that is configured to support said scheduler.

43. The apparatus as recited in claim 23, wherein said logic is configured to allow said transmitter and said receiver to operate simultaneously.

44. The apparatus as recited in claim 43, wherein said transmitter and said receiver to operate simultaneously within non-overlapping frequency bands.

45. The apparatus as recited in claim 43, wherein said transmitter and said receiver to operate simultaneously within a single frequency band.

46. The apparatus as recited in claim 45, wherein said logic is further configured to reduce interference from said transmitter by detecting and significantly removing unwanted coupling that occurs at said antenna array.

47. The apparatus as recited in claim 45, wherein said antenna array is included in at least one panel having a plurality of elements arranged therein, each of said plurality of elements being selectively configurable by said logic for use by said transmitter or said receiver.

48. The apparatus as recited in claim 45, wherein said antenna array includes a first element arranged to provide a first polarization and a second element arranged to provide a second polarization that is different than the first polarization.

49. The apparatus as recited in claim 20, further comprising:
at least one communication interface operatively coupled to said at least one transmitter and said at least one receiver and configurable to provide connectivity to at least one external device.

50. The apparatus as recited in claim 49, wherein said at least one communication interface is configurable to provide connectivity to the Internet.

51. The apparatus as recited in claim 20, wherein said transmitter and said receiver are each configured to operate according to at least one communication scheme selected from a group of communication schemes comprising a request to send (RTS)/clear to send (CTS) scheme, a time division duplex (TDD) scheme, a frequency division duplex (FDD) scheme, a frequency simplex division duplex (FSDD) scheme, a time division multiple access (TDMA) scheme, an orthogonal frequency division multiplexing modulation (OFDM) scheme, an orthogonal frequency division multiple Access (OFDMA) scheme, quadrature amplitude modulation (QAM), and a spread spectrum scheme.

52. A wireless routing network system comprising:
at least one wireless routing device having at least one receiver configured to receive at least one incoming electromagnetic signal and output at least one corresponding received signal, at least one transmitter configured to receive a data signal and output a corresponding transmission signal, and at least one adaptive antenna operatively coupled to said at least one receiver and said at least one transmitter and configured to receive said transmission signal and in response transmit corresponding outgoing multi-beam electromagnetic signals exhibiting a plurality of selectively placed transmission peaks and transmission nulls within a far field region of a coverage area, and to selectively receive at least one incoming electromagnetic signal directed through said coverage area and cross-correlate data sequences in said at least one received signal and based thereon selectively adjust said outgoing multi-beam electromagnetic signals; and
at least one client premise equipment (CPE) device operatively configured to receive said outgoing multi-beam electromagnetic signals.

53. The system as recited in claim 52, wherein said cross-correlated data sequence is selected from a group of cross-correlatable data sequences comprising a data sequence from at least one received synchronization packet, a data sequence from at least one header portion of a received packet, and a data sequence from at least one PLCP header portion of a received packet.

54. The system as recited in claim 52, wherein said adaptive antenna includes at least one antenna array comprising a plurality of antenna elements, and logic operatively coupled to said antenna array, said at least one transmitter and said at least one receiver, and configured to selectively control said placement of transmission peaks and transmission nulls within said outgoing multi-beam electromagnetic signals, and further configured to selectively control said reception of said at least one incoming electromagnetic signal.

55. The system as recited in claim 54, wherein said placement of transmission peaks and transmission nulls within said outgoing multi-beam electromagnetic signals and said selective control of said reception of said at least one incoming electromagnetic signal is operatively associated with one adaptive antenna array.

56. The system as recited in claim 54, wherein said logic is responsive to routing information in selectively controlling said placement of transmission peaks and transmission nulls within said outgoing multi-beam electromagnetic signals, and selectively controlling said reception of said at least one incoming electromagnetic signal.

57. A computer-readable medium having stored thereon a data structure, comprising:
indexing data fields containing data representing identifiers associated with different communicating nodes within a wireless network and suitable for use in operatively controlling the selective transmission of at least one directed electromagnetic beam within said wireless network;
weighting data fields containing data representing communication weighting values associated with corresponding indexing data fields; and
subscriber information data fields representing subscriber routing information associated with said different communicating nodes.

58. The computer-readable medium as recited in claim 57, wherein each of said identifiers associated with different communicating nodes is selected from a group of node identifiers comprising connection identifiers (CIDs) and network addresses.

59. The computer-readable medium as recited in claim 57, wherein each of said weighting values in said weighting data fields associated with said corresponding indexing data fields is based on a polynomial expansion $w(z)=w_0+w_1z+w_2z^2+w_3z^3+w_4z^4+ \ldots +w_iz^i$.

60. The computer-readable medium as recited in claim 57, further comprising at least one data field containing routing information selected from a group of routing information comprising transmit power level information, transmit data rate information, antenna pointing direction information, weighting information, constraints information, transmission null location information, transmission peak location information, Quality of Service (QoS) information, priority information, data packet lifetime information, frequency information, timing information, keep out area information, node directional information, node transmit power level information, node received signal strength indicator (RSSI) level information, transmit channel information, backup transmit channel information, receive channel information, backup receive channel information, transmission data rate information, receive data rate information, interference nulling information, queue information, peak data rate information, sustained data rate information, latency information, and isochronous performance information.

61. A method for use in a wireless routing device that is operatively configured within a request to send (RTS)/clear to send (CTS) wireless routing network, the method comprising:

determining if there is a potential for interference with neighboring nodes prior to transmitting an CTS message based at least in part on a cross-correlation of data sequences in received data packets; and if there is no significant potential for interfering with said neighboring nodes, then transmitting said CTS message to a targeted node using a narrow beam, otherwise, if there is a significant potential for interfering with one or more of said neighboring nodes, then transmitting said CTS message to said targeted node and said one or more of said neighboring nodes using one or more beams.

62. The method as recited in claim 61, wherein if there is a significant potential for interfering with a significant plurality of said neighboring nodes, then transmitting said CTS message to said targeted node and said significant plurality of said neighboring nodes using an omnidirectional transmission pattern.

63. A reciprocal feedback method for use in a wireless routing network, the method comprising:

at a first wireless routing device, measuring an unwanted signal from a second wireless routing device and updating routing information based at least in part on cross-correlated data sequences in received data packets;

causing said first wireless routing device to provide information associated with said measured unwanted signal to said second wireless routing device; and causing said second wireless routing device to adaptively apply a transmission null in a direction towards said first wireless routing device based on said information associated with said measured unwanted signal, such that subsequent transmissions by said second wireless routing device will be substantially reduced in said direction towards said first wireless routing device.

64. A search receiver method for use in a wireless routing network, the method comprising:

processing a signal received by at least one antenna array to corresponding produce element domain values;

converting said element domain values into corresponding pattern domain values;

estimating channel data and calculating total power based on said pattern domain values;

cross-correlating header information using said estimated channel data;

extracting system signal parameters based on said cross-correlation header information;

conducting a division process using said calculated total power and said cross-correlation header information;

extracting non-system signal parameters from resultant data from said division process;

determining weighting values based on said extracted system signal parameters and said extracted non-system signal parameters; and storing said weighting values for subsequent use during signal transmission.

65. The method as recited in claim 64, further comprising:

storing said weighting values for subsequent use during signal reception.

66. The method as recited in claim 64, wherein said division process includes a Wiener filter division process.

* * * * *

UNITED STATES PATENT AND TRADEMARK OFFICE
CERTIFICATE OF CORRECTION

PATENT NO. : 6,611,231 B2
DATED : August 26, 2003
INVENTOR(S) : Crilly, Jr. et al.

It is certified that error appears in the above-identified patent and that said Letters Patent is hereby corrected as shown below:

Column 32,
Line 52, replace "CORDJC" with -- CORDIC --.

Signed and Sealed this

Nineteenth Day of October, 2004

JON W. DUDAS
*Director of the United States Patent and Trademark Office*